United States Patent [19]

Mooney et al.

[11] Patent Number: 4,954,966

[45] Date of Patent: Sep. 4, 1990

[54] TERMINAL WITH VIEWPORTS, AUXILIARY DEVICE ATTACHMENT, AND HOST-TERMINAL FLAN CONTROL

[75] Inventors: Robery C. Mooney, Melrose; Richard J. Peirent, Tewksbury, both of Mass.

[73] Assignee: Wang Laboratories, Inc., Lowell, Mass.

[21] Appl. No.: 907,294

[22] Filed: Sep. 12, 1986

[51] Int. Cl.⁵ .................................................. G06F 3/037
[52] U.S. Cl. ...................................... 364/518; 364/140; 340/717; 340/825.02
[58] Field of Search ............... 364/137, 138, 140, 521, 364/518; 340/717, 825.02, 347 C

[56] References Cited

U.S. PATENT DOCUMENTS

| | | | |
|---|---|---|---|
| 4,412,294 | 10/1983 | Watts et al. | 364/518 |
| 4,493,021 | 1/1985 | Agrawal et al. | 364/200 |
| 4,494,194 | 1/1985 | Harris et al. | 364/200 |
| 4,591,967 | 5/1986 | Mattes et al. | 364/200 X |
| 4,633,246 | 12/1986 | Jones et al. | 340/825.02 X |
| 4,642,790 | 2/1987 | Minshull et al. | 364/521 X |
| 4,649,513 | 3/1987 | Martin et al. | 364/900 |
| 4,665,501 | 5/1987 | Saldin et al. | 340/717 X |
| 4,688,170 | 8/1987 | Waite et al. | 364/200 |

OTHER PUBLICATIONS

Datapro Research Report C25-010 Display Terminals, Data Pro Research, Delran, N.J., Jan. 1985, pp. C250-010-105-111.
IBM Product Announcement, IBM 3161 and IBM 3163 ASCII Display Strategies, IBM, Jun. 18, 1981.
ADM 12 VDT User's Reference Manual, Lear-Siegler, Inc. Anaheim, CA 1983, pp. 3-27 to 3-29.
Televideo VDT Operator's Manual, Model 924, Televideo Systems, Inc. Sunnyvale, CA 1983, pp. 50-54.

Primary Examiner—Gary V. Harkcom
Assistant Examiner—Mark K. Zimmerman
Attorney, Agent, or Firm—Michael H. Shanahan; Gordon E. Nelson

[57] ABSTRACT

In a dumb terminal to which an auxiliary device may be attached, improvements in display definitions. In the transfer of data between a host computer and the terminal or an auxiliary device, and in character generation memory. In the area of display definition, pages may be mapped onto the terminal's display memory and viewports may be mapped onto pages. Page and viewport definition are independent of each other and settable modes permit a viewport to follow the active position. In the area of transfer of data, the source of data for the host computer and the destination of data from the host computer may be specified independently. Improvements in flow control ensure that the host computer can always change the destination of data and gain control of the terminal. Improvements in access control ensure that neither the terminal nor the auxiliary device can monopolize transfer between it and the host. Moreover, transfer can proceed transparently even when non-ASCII 8-bit codes or a 7-bit host-terminal link are involved. Finally, a protocol permits one portion of character generation memory to be copied to another portion thereof.

33 Claims, 14 Drawing Sheets

CSI> [MODE NO]; ··· [MODE NO]; h
        SET MODE PROTOCOL 601

CSI> [MODE NO]; ··· [MODE NO]; l
        RESET MODE PROTOCOL 603

| | | |
|---|---|---|
| 30 | TRANSPARENCY MODE | 607 |
| 31 | TAG MODE | 609 |
| 32 | TRANSMIT SOURCE MODE | 611 |
| 33 | LINK ROUTING MODE | 613 |
| 34 | INTERLEAVE MODE | 615 |
| 35 | MESSAGE WAITING ENABLE MODE | 617 |
| 39 | IGNORE AUX PORT FLOW CONTROL MODE | 619 |
| 41 | AUX BUFFER EMPTY NOTIFICATION MODE | 621 |

TRANSFER MODES 605

| | | |
|---|---|---|
| 29 | AUTO MAP | 625 |
| 36 | AUTO ALIGNMENT | 627 |
| 8 | CURSOR ATTACH MODE | 629 |

VIEWPORT MODES 623

FIG. 6

X'11'   XON 703

X'13'   XOFF 705

X'12'   TERMINAL DATA TAG 707

X'14'   AUX DATA TAG 709

X'95'   MESSAGE WRITING 711

DATA TRANSFER CONTROL CODES 702

CSI 4i   SELECT TERM AS DESTINATION 713

CSI 5i   SELECT ANY PORT AS DESTINATION 715

DATA TRANSFER COMMANDS 712

FIG. 7

| | |
|---|---|
| NPMEM | 825 |
| NPRTP | 1017 |
| APN | 1103 |
| AVPN | 1105 |
| ACN | 1107 |
| ARN | 1109 |
| ARS | 1111 |
| ARE | 1113 |
| APA | 1115 |
| CPA | 1117 |
| PTP | 1119 |
| PBP | 1121 |
| VPHC | 1123 |
| VPHR | 1125 |
| VPRHC | 1127 |
| VPRHR | 1129 |
| PDRC | 1131 |
| PDRR | 1133 |

APD 1101

FIG. 11

CSI > [SR]; [ER]; [SN]; [SD] S           SCROLL REGION 1201

CSI > [PR]; [PC]; [PN] H                 SET ACT. POS 1207

CSI [VP(2)R];...;[UP(n)R] X'23'w         DEFINE VIEWPORTS 1209

CSI [PN]; [UPN]; [PSR]; [PSC] X'23'z     ASSIGN PAGE TO VIEWPORT 1211

CSI [PN]; [PR]; [PC] X'23'y              DEFINE PAGE 1213

CSI [PD]; [PDR]; [PS]; [NR]; [CM] X'23' X' 7C'   COPY REGION 1215

FIG. 12

| BLA | SU | SR | BLI | DU | HI | CS1 1305 | CS2 1307 |
|---|---|---|---|---|---|---|---|

CSS 1303 spans CS1, CS2. AB 1301.

FIG. 13

CSI [SE]; [DE]; [SS]; [DS]; [NC] X' 23' v

FIG. 15

TERMINAL WITH VIEWPORTS, AUXILIARY DEVICE ATTACHMENT, AND HOST-TERMINAL FLAN CONTROL

BACKGROUND OF THE INVENTION

1. Field of the Invention

The present invention relates to digital data and word processing systems and more particularly to terminals employed therein.

2. Description of the Prior Art

One of the most common varieties of prior-art terminal is the "dumb" terminal. A "dumb" terminal is so called because it performs no local processing of data beyond what is required to receive the data in the terminal and provide it to a digital computer or to receive the data from the digital computer and display it on the terminal screen. Communication between the "dumb" terminal and the digital computer is by means of protocols. Different protocols specify the data transferred between the digital computer and the terminal, permit the digital computer to control the operation of the terminal, and indicate the state of the terminal to the digital computer. A common class, of "dumb" terminals is made up of ANSI (American National Standards Institute) standard terminals which are controlled by means of protocols compatible with the ANSI X3.4, X3.41, and X3.64 standards.

As microprocessors, display controllers, and memory have dropped in cost and grown in speed and power, the "dumb" terminals have become "smarter". An example of such a "smart" "dumb" terminal is the IBM 3163. This and similar ANSI standard terminals now have sufficient display memory to hold more than one terminal screen's worth of data. In such terminals, the display memory is divided into pages and a user of the terminal can specify which page of display memory is to be displayed. The 3163 and others of these terminals also permit the terminal screen to be divided into viewports. A viewport is a "window" onto a page, and consequently, a terminal with viewports can display data from more than one page simultaneously.

Other areas where "dumb" terminals have grown smarter include the capability of transferring data not only between the terminal and the computer, but also between the computer and an auxiliary device connected to the terminal and the capability of displaying more than one character font. In all of these areas, the prior art has left certain problems unsolved. These problems are addressed in the improved terminal of the present invention.

SUMMARY OF THE INVENTION

The present invention relates to terminals for use in digital computer systems and more specifically to "dumb" terminals. One or more pages may be defined in the improved terminal of the present invention. Varying amounts of display memory may be mapped to a defined page or a defined page may be mapped to no display memory at all. Any page may have a viewport assigned to a location on it. The viewport may have a varying number of lines or no lines at all. Independent protocols define pages, define viewports, and assign viewports to pages. Apparatus in the terminal insures that if a line in a viewport has no corresponding line in the page to which the viewport is assigned, the line in the viewport displays blanks. The improved terminal also permits a viewport to automatically follow the active position, i.e., the position in display memory at which operations are presently being performed and permits the active position to be detached from the cursor position. Finally, a region in a page may be scrolled and a region in a page may be copied to a region in any page.

The improved terminal of the present invention further permits independent specification of the terminal and an auxiliary device attached thereto as a source of or destination of data transferred between a digital computer and the terminal. Thus, the terminal may be a destination of data received from the computer while the auxiliary device is a source of data for the computer and vice-versa. Other improvements in the area of transfer of data between the computer and the terminal or auxiliary device include improved flow control which generally permits the computer to switch flow from the auxiliary device to the terminal, improved access control which generally prevents the auxiliary device or the terminal from exluding the other device from communicating with the computer, and emplying the ANSI INT code to permit the computer to gain control of the terminal under any circumstances. A transparency mode further permits automatic translation of 8-bit protocols into ANSI equivalent prefix+-code sequences, thus permitting operation of the terminal with a 7-bit link between the terminal and the computer or with auxiliary devices which employ non-ANSI codes.

Finally, the improved terminal may have character sets stored in a plurality of character set memory elements. Selection of an element is by means of bits in the attribute byte associated with each character code in display memory. Certain of the character set memory elements are writable, and a novel protocol permits a portion of one character set memory element to be copied into another writable character set memory element.

It is thus an object of the invention to provide an improved terminal;

It is another object of the invention to provide a terminal permitting independent definition of pages and viewports;

It is a further object of the invention to provide an improved display in a terminal having pages and viewports;

It is an additional object of the invention to provide a terminal in which a region of a page may be scrolled or copied.

It is still another object of the invention to provide improved control of transfer of data between a digital computer, a terminal, and an auxiliary device attached to the terminal;

It is a yet further object of the invention to provide transparent transfer of data between the auxiliary device and the terminal;

It is a further additional object of the invention to provide an improved character memory.

Other objects and advantages of the present invention will be understood by those of ordinary skill in the art after referring to the detailed description of a preferred embodiment contained herein and to the drawings, wherein:

BRIEF DESCRIPTION OF DRAWINGS

FIG. 6, titled "Mode Commands and Modes", is a list of mode set and reset commands and the modes;

FIG. 7, titled "Data Transfer Protocols", is a list of data transfer protocols;

FIG. 11, titled "Active Page Data Structure 1101", is a diagram of the active page data structure in the improved terminal;

FIG. 12, titled "Page and Viewport Protocols", is a list of page and viewport protocols;

FIG. 13, titled "Attribute Byte in Term 103", is a diagram of an attribute byte in the improved terminal;

FIG. 15, titled "Copy CGM Protocol 324", shows the copy CGM protocol in the improved terminal. For ease of reference to figures, the reference numbers used in the description of the preferred embodiment have three or 4 digits. The two least-significant digits are reference numbers within a drawing; the remaining digits are the drawing number. For example, the reference number 1301 refers to an item shown in FIG. 13.

DESCRIPTION OF A PREFERRED EMBODIMENT

The following Description of a Preferred Embodiment of the improved terminal of the present invention will first present an overview of a system in which the terminal is employed, then overviews of the logical structure and an implementation of the improved terminal, and finally, detailed descriptions of the data transfer and display components of the improved terminal.

Figure 1:
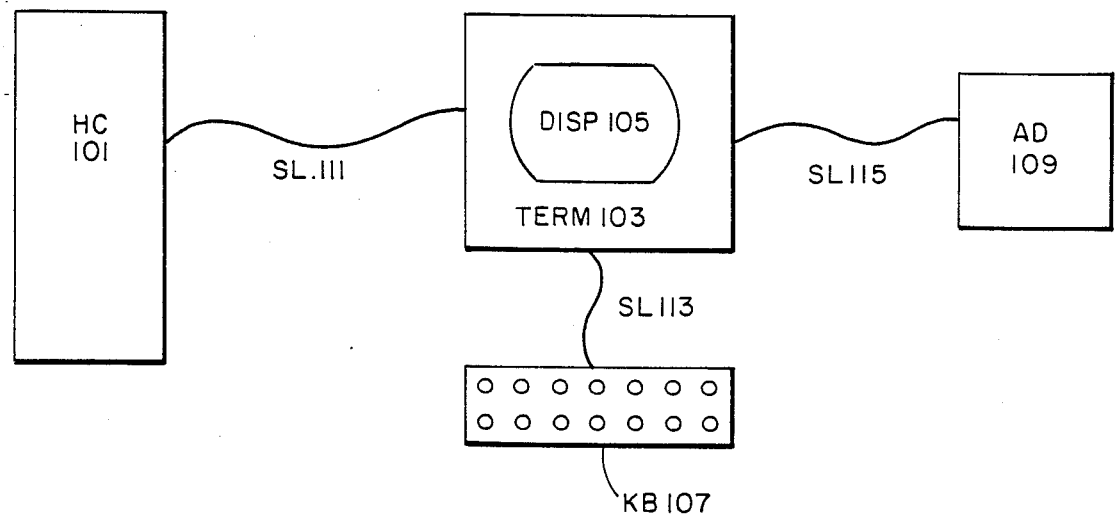
FIG. 1, titled "System with Improved Terminal", is a conceptual block diagram of a system employing the improved terminal.

1. System Employing the Improved Terminal: FIG. 1

The improved terminal of the present invention is a so-called "dumb" terminal for use with a digital computer system. The terminal is termed a "dumb" terminal because it performs no local processing of data beyond what is required to receive the data at the terminal and provide it a digital computer or to receive the data from the digital computer and display it on the terminal screen.

FIG. 1 shows a system using the improved terminal. Terminal TERM 103 is connected by serial link (SL) 111 to host computer (HC) 101. TERM 103 includes CRT display DISP 105 and is connected by further SL 113 to keyboard (KB) 107 and by SL 115 to auxiliary device (AD) 109. HC 101 may be any computer, for example, a VS computer manufactured by Wang Laboratories, Inc. AD 109 may be any device which can transmit or receive serial data, but will most generally be a printer or other hard-copy display device. In a preferred embodiment, TERM 103 is a character terminal, SL 111 is an RS 232 link, and communication across SL 111 with HC 101 is by means of protocols compatible with the ANSI X3.4, X3.41, and X3.64 protocols. The protocols include protocols for characters, control protocols which control the manner in which TERM 103 operates, protocols to control routing between HC 101 and TERM 103 or AD 109, and protocols by means of which HC 101 can receive information from TERM 103 about its status.

Operation of TERM 103 is as follows: When a user of KB 207 strikes a key on KB 107, TERM 103 packages the character into the proper protocol and sends the protocol via SL 111 to HC 101. If a program executing on HC 101 wishes to display a character on TERM 103, it sends a protocol for the character via SL 113 to TERM 103, which displays the character at the proper position in DISP 105. If the program wishes to alter operation of TERM 103 or determine TERM 103's status, it employs the proper protocols for those ends.

DISP 105 in TERM 103 may display data from up to 8 pages retained in TERM 103. What pages are displayed and what data on a page is displayed is determined by viewports. A viewport is a group of lines in DISP 105 which are associated with a group of lines on a given page. The lines associated with the viewport on the page appear on the lines in DISP 105 associated with the viewport The size of pages, the size of viewports, the association between a viewport and a group of lines on a screen, and the association between a viewport and a group of lines on a page are all controlled by protocols from HC 101.

AD 109 may be controlled either by the user of TERM 103 or by a program operating on HC 101. In the former case, AD 109 can print lines or screens of data displayed on DISP 105; in the latter case, HC 101 may provide data to or receive data from AD 109. When HC 101 is providing data, the data goes via SL 111 to TERM 103, which repackages it as required for AD 109, and then sends it via SL 115 to AD 109. When HC 101 is receiving data from AD 109, the data goes via SL 115 to TERM 103, which does any repackaging necessary for HC 101, and then sends the data on to HC 111 via SL 111. Destination and direction of flow of data between HC 101, TERM 103, and AD 109 is controlled by means of protocols sent by HC 101 to TERM 103 and by TERM 103 to HC 101. In the improved terminal, the protocols permit simultaneous transfer in one direction between HC 101 and TERM 103 and in the other between AD 109 and HC 101.

Figure 2:
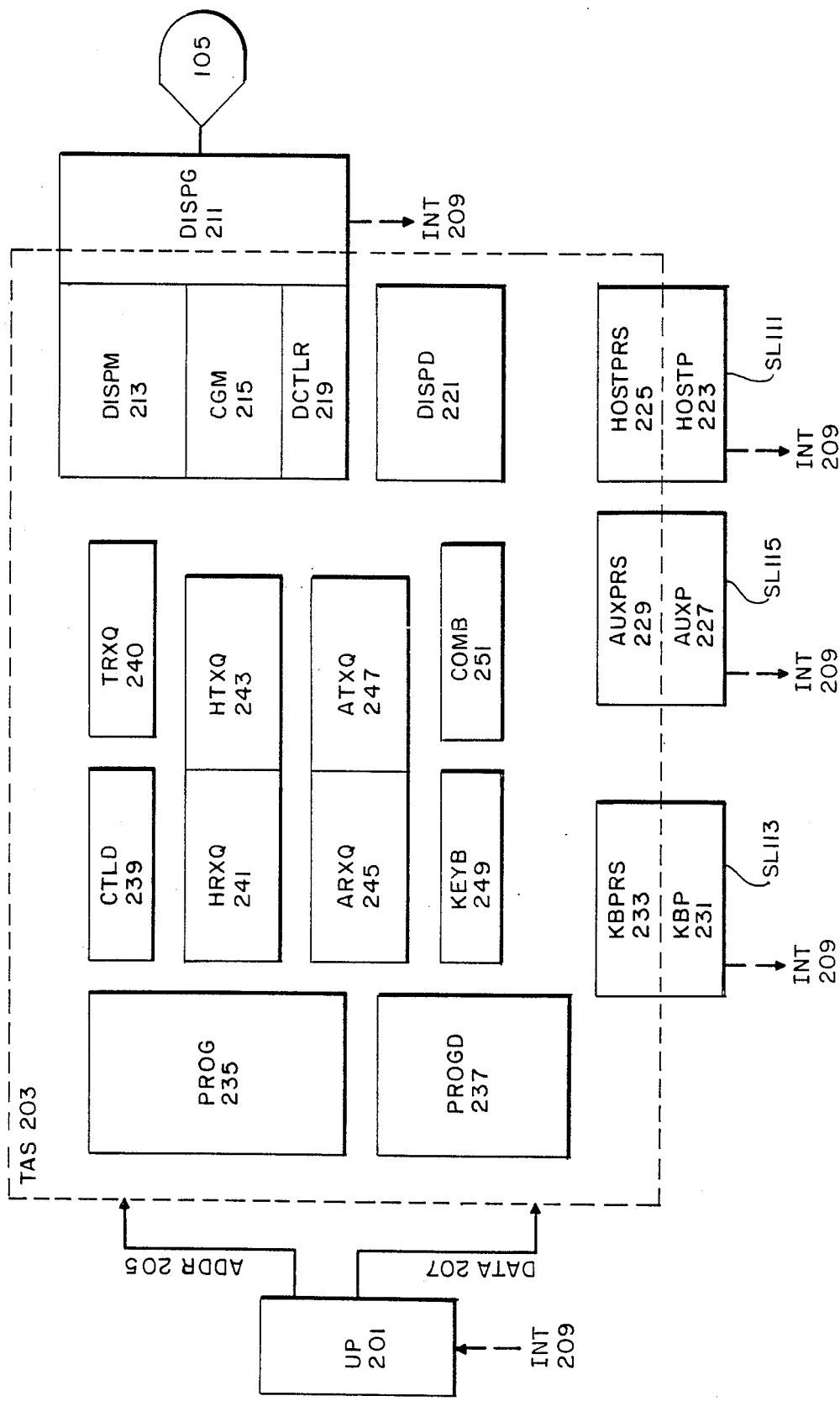
FIG. 2, titled "Logical Overview of Term 103", is a logical overview of the improved terminal.

2. Logical Overview of TERM 103: FIG. 2

In logical terms, TERM 103 is implemented by means of a group of devices which share a common terminal address space. FIG. 2 shows the devices, the common terminal address space (TAS) 203, and the manner in which the devices relate to each other by means of the address space and interrupt signals INT 209.

Overall control of TERM 103 is provided by microprocessor (uP) 201. uP 201 is connected to TAS 203 by means of ADDR bus 205, which carries addresses from up 201 to TAS 203, and DATA bus 207, which provides data from up 201 to the address specified in TAS 203 by the address on ADDR 205 or fetches data from that location in TAS 203 to up 201, depending on whether up 201 is performing a read or write operation on TAS 203. uP 201 contains registers for retaining data to be output to DATA bus 207 or received from DATA bus 207 and addresses to be output to ADDR bus 205 and ALUs for manipulating data and addresses. Operations performed by uP 201 are determined by programs in PROG 235 of TAS 203. uP 201 further receives interrupt signals at INT 209 from other devices in TERM 103. In response to such an interrupt signal, uP 201 executes interrupt code in PROG 235. Data required for execution of the programs, for example, stacks and work areas, is contained in PROGD 237. CTLD 239 contains control data which indicates the present status of TERM 103 to uP 201.

Transfer of data between TERM 103 and KB 107 is managed by keyboard port (KBP) 231. KBP 231 includes registers (KBPRS) 233 which are part of TAS 203, and hence accessible to uP 201. KBPRS 233 in a preferred embodiment include a transmit register for a byte of data, a receive register for a data byte, a register for a command word, and a register for a status word. When uP 201 is transferring data to KB 107, for example to set certain characteristics of KB 107, uP 201 first places a command word specifying that data is going to KB 107 and then places a sequence of data bytes in the transmit register. As KBP 231 receives each data byte, it converts the data byte from parallel to serial form and outputs it to KB 107. The status of the transfer is retained in the status register, where it may be read by uP 201. When a user hits a key on KB 107, KBP 231 receives the code corresponding to the keystroke via SL 113. KBP 231 converts the code from serial to parallel form, places the parallel value in the receive register, sets the status register to indicate that a keystroke code has been received, and sends an interrupt via INT 209 to uP 201, which responds to the interrupt by executing interrupt handler code in PROG 235. The interrupt handler code examines the status register in KBPRS 233 to determine the cause of the interrupt. If it was caused by the receipt of a keyboard code, the interrupt handler code moves the received keystroke code from KBPRS 233 to keystroke buffer (KEYB) 249, where it is available for further processing by uP 201.

Transfer of data between HC 101 and TERM 103 is managed by host port (HOSTP) 223, and transfer of data between AD 109 and TERM 103 is managed by AUXP 227. These ports operate generally in the same manner as KBP 231: registers in auxiliary port registers (AUXPRS) 229 and host port registers (HOSTPRS) 225 contain data to be transferred, a command word, and a status word as described for KBP 231 and transfers occur in the same fashion. Thus, when TERM 103 sends bytes of data to HC 101, uP 201 writes a command word into HOSTPRS 225 and then provides a sequence of bytes to those registers; when HC 101 sends a byte of data to TERM 103, HOSTPRS 225 receives the byte, sets a status register to indicate that fact, and generates an interrupt signal on INT 209 to uP 201. The interrupt handler code which uP 201 executes in response to the interrupt copies the byte from HOSTPRS 225 to host receive queue (HRXQ) 241, where it is available for further processing. Other queues used in connection with HOSTP 223 and AUXP 227 in the fashion described above for HRXQ 241 are host transmit queue (HTXQ) 243, which contains data to be transmitted to HC 101 by HOSTP 223, auxiliary receive queue (ARXQ) 245, which contains data received in AUXP 227 from AD 109, and auxiliary transmit queue (ATXQ) 247, which contains data to be transmitted to AD 109 by AUXP 227. Additionally, terminal receive queue (TRXQ) 240 receives data from TERM 103 which is to be placed in HTXQ 243 for transmittal to HC 101.

Displays on DISP 105 are generated by display generator (DISPG) 211. The data used to generate the display is contained in display memory (DISPM) 213 and character generator memory (CGM) 215. DISPM 213 contains rows of data to be displayed in DISP 105. Each character in a row is represented by a 1-byte character code and a 1-byte attribute code indicating how the character specified by the character code is to be displayed. As previously mentioned, DISPM 213 may be divided into uP to 8 pages. CGM 215 contains a visual representation corresponding to each character code. When CGM 215 receives a character code as an input, it outputs the visual representation to DISPG 211 for display on DISP 105.

Operation of DISPG 211 is controlled by display control registers (DCTLR) 219 in a manner similar to that described for KBP 231. When uP 201 wishes to display data on DISP 105, it first loads registers in DCTLR 219 to initialize DISPG 211. Then it loads the character codes for the data and the codes for the attributes into DISPM 213. Next, it loads pointers specifying the rows in DISPM 213 to be displayed into a rowtable in display data (DISPD) 221. Then it loads a pointer to the rowtable into DCTLR 219 and finally issues a command which turns DISPG 211 on. DISPG 211 responds to the command by fetching each character code and each corresponding attribute code in each row specified in the rowtable and displaying it on DISP 105, employing CGM 215 to convert the character code to its visual representation, and using the attribute code to modify the manner in which the visual representation is displayed. DISPG 211 continues in this manner until uP 201 inactivates the display or a condition arises which requires intervention by uP 201. While DISPG 211 is operating as just explained, uP 201 may modify the display on DISP 105 by changing the contents of DISPM 213 or by modifying the rowtable so that DISPG 211 displays different rows of DISPM 213 on display 105. When DISPG 211 requires intervention of uP 201, it provides an INT 209 to uP 201, to which uP 201 responds by executing interrupt code which examines the status registers in DCTLR 219 and performs whatever action is necessary to deal with the indicated status.

As previously indicated, HC 101 controls TERM 103 by means of protocols sent via SL 111 to TERM 103. The protocols may be a single byte long or may be multi-byte protocols. The protocols include codes indicating characters to be displayed on DISP 105, control codes indicating operations to be performed by TERM 103, and commands. The commands are introduced by command control codes and contain parameter bytes representing parameters used in the command and command specification bytes. Certain codes used in the protocols are used to indicate that a protocol has a private meaning.

Each time a byte is received in HRXQ 241 from HC 101, uP 201 examines the byte to determine how it should be processed. In the case of protocols indicating characters to be displayed, the characters are simply written to DISPM 213; in the case of single-byte control codes, state variables in CTLD 239 are altered to specify the new state of TERM 103 and uP 201 begins operating the terminal as required for the control code. In the case of a command, uP 201 responds to the command control code and the command byte by collecting the parameter bytes and the command specifier in command buffer (COMB) 251. uP 201 then executes the command as specified by the command specifier and the parameter bytes.

Figure 3:
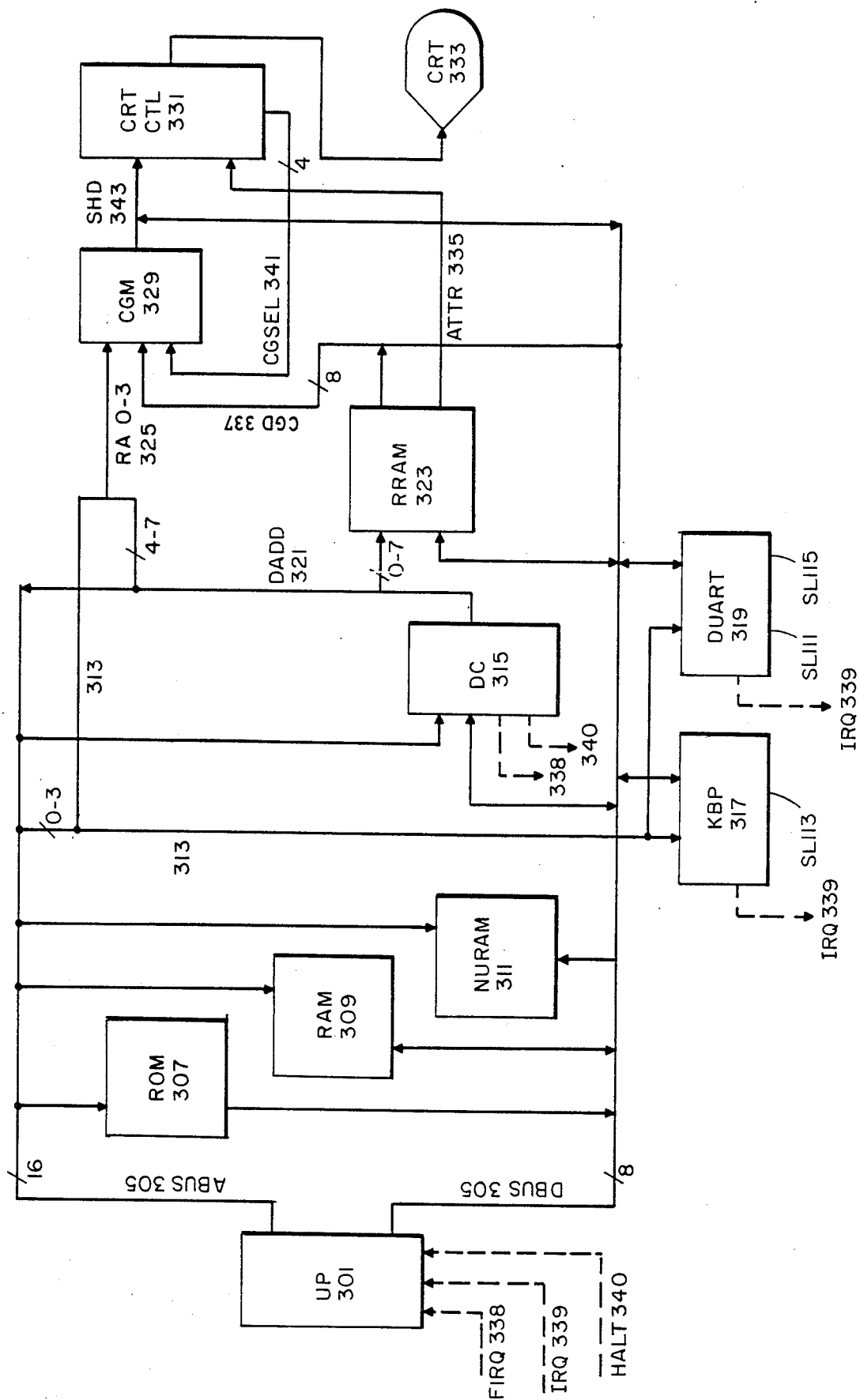
FIG. 3, titled "Implementation TERM 103", is a block diagram of an implementation of a preferred embodiment of the improved terminal.

Included in the command protocols to which TERM 103 responds are commands which determine the flow of data between HC 101, TERM 103, and AD 109, a command which define pages in DISPM 213, a command which defines viewports, a command which assigns a viewport to a page, and commands which determine how page and viewport mapping interacts with changes in the the location of current interest in DISPM 213. 3. Implementation of Term 103: FIG. 3

FIG. 3 presents an overview of a preferred implementation of TERM 103. uP 201 is implemented by means of uP 301, a MC 6809C microprocessor manufactured by Motorola, Inc. The MC 6809C is described in the MC6809-MC6809E *Microprocessor Programming Manual*, Motorola, Inc., 1981, incorporated herein by reference. uP 301 receives two different interrupt signals, interrupt request (IRQ) 339 and fast interrupt request (FIRQ) 338. In a preferred embodiment, IRQ 339 receives interrupts generated by the keyboard port (KPB 317) and the host and auxiliary ports (DUART 319), while FIRQ 338 receives interrupts from display controller (DC) 315, a component of the display generator. TAS 203 is implemented by means of ROM 307, RAM 309, non-volatile RAM (NVRAM) 311, now RAM (RRAM) 323, character generator memory (CGM) 329, and command, data, and status registers in KBP 317, DUART 319, and DC 317. Data is transferred between uP 301 and the components of TAS 203 by 8-bit DBUS 305, and addresses are provided to the components by 16-bit ABUS 303.

ROM 307 contains programs executed by uP 301, and consequently corresponds to PROG 235. RAM 309 is used for general data storage, and corresponds to PROGD 237, HRXQ 241, HTXQ 243, TRXQ 240, ARXQ 245, ATXQ 247, COMB 251, KEYB 249, DISPM 213, and portions of CTLD 239 and DISPD 221. NVRAM 311 does not lose its contents when TERM 103 is turned off, and is consequently used to store those portions of CTLD 239 and DISPD 221 which are to be retained between uses of TERM 103. CGM 329, finally, corresponds to CGM 215.

In a preferred embodiment, CGM 329 contains a ROM element and a RAM element and provision is further made in TERM 103 for the addition of two external ROM or RAM cartridge elements. The additional elements contain further alternate fonts or character sets. In the case of the RAM, uP 301 may load the RAM with the visual representations of an alternate font or character set in response to a protocol from HC 301 which contains the visual representations as parameters. Visual representations in CGM 329 are addressed as follows: two bits in the attribute byte corresponding to the character being output to CRT CTL 331 select one of the four elements of CGM 329; then the visual representation corresponding to the character code is selected by means of 12-bit addresses made uP of 4 bits on RA0 325 and 8-bit character codes on CGD 337. As shown in FIG. 3, the signals which select an individual element come via GCSEL 341 from CRT CTL 331; addresses on RA 325 may come either via a latch (not shown) from uP 301 or from DC 315, while those on CGD 337 may come either by way of DBUS 305 and a latch (not shown) from uP 301 or from RRAM 323. Addresses from uP 301 are used when uP 301 is reading CGM 329 or loading RAM in GCM 329; those from DC 315 and RRAM 323 are used when TERM 103 is displaying data on DISP 105. Data for loading RAM in CGM 329 comes via DBUS 305 from uP 301.

KBP 317 corresponds to KBP 231. It is implemented by means of a MC 68B50 asynchronous communications interface adapter integrated circuit, manufactured by Motorola, Inc., and fully described at page 3-495 of 8-*Bit Microprocessor and Peripheral Data Manual*, manual no. DL133, Motorola, Inc, 1983. That manual is hereby incorporated into the present Specification by reference. DUART 319 has two ports, and corresponds to both AUXP 227 and HOSTP 223. DUART 319 is implemented by means of a SCN2681 dual asynchronous receiver/transmitter integrated circuit, manufactured by Signetics, Inc. DUART 319 is fully described in *Microprocessor Data Manual*, Signetics, Inc., 1986, pg. 2-89. That manual is also incorporated herein by reference. As may be seen from FIG. 3, the registers contained in KBP 317 and DUART 319 are addressed by means of bits 0-3 of ABUS 303 and data is provided to and received from the registers by means of DBUS 305.

When KBP 317 receives a byte from KB 107, or DUART 319 receives a byte from either HC 101 or AD 109, it produces an interrupt signal on IRQ 339.

DISP 105 is implemented in FIG. 3 by means of CRT 333 and DISPG 211 is implemented by means of display controller (DC) 315, row RAM (RRAM 323), CGM 329, and CRT control logic (CRT CTL) 331. DC 315 controls display of characters on CRT 333. In TERM 103, DC 315 is an advanced video display controller SCN2674, manufactured by Signetics, Inc. The SCN2674 is fully described at page 2-123 of the *Microprocessor Data Manual*. Operation of DC 315 is controlled by internal registers in DC 315 corresponding to DCTLR 219. Included in the internal registers are a pointer to the row table and a pointer to the row table entry containing the location of the row currently being displayed. Data for the registers is received from DBUS 305, and addresses from bits 0-2 of ABUS 303. Output from DC 315 is 14 bits of display address (DADD) 321. Bits 0-7 of DADD 321 provide addresses to RRAM 323, which contains the character codes and attributes for the row currently being output for display on CRT 333. Bits 0-14 provide addresses via a latch (not shown) and ABUS 303 to TAS 203, permitting DC 315 to copy rows of data (character codes and their attributes) from DISPM 213 in TAS 203 via DBUS 305 and a latch (not shown) to RRAM 323. During the period that DC 315 is copying a row of data, it emits HALT signal 340, which keeps uP 301 from using ABUS 303 and DBUS 305. After DC 315 has copied the row of data into RRAM 323, it causes RRAM 323 to output the data one byte at a time. The character code is output first and is latched. Then, the corresponding attribute byte is output and latched. The character code goes via CGD 337 to CGM 329, which outputs the corresponding visual representation from the element selected by the bits in the attribute byte. The visual representation goes via shift data (SHD) 343 to CRTCTL 331. At the same time, the attribute goes via ATTR 335 to CRT CTL 331. In response to the visual representation and the attribute, CRT CTL 331 produces the character on CRT 333. After the entire row has been output from RRAM 323 as described above, DC 315 fetches the next row specified in the row table from DISPM 213. When the end of the row table is reached, DC 315 begins the cycle again with the first row in the row table. If DC 315 requires intervention of uP 301 during operation, it generates a FIRQ signal 338 to uP 301, which responds to the signal by executing interrupt code which examines the registers in DC 315 to determine the cause of the interrupt.

Operation of the implementation of TERM 103 shown in FIG. 3 is as described in logical terms above. A byte from HC 101 is received in DUART 319, an IRQ 339 is generated, and uP 301 executes interrupt code which places the byte in HRXQ 241. uP 301 examines the byte and the present state of TERM 103 as indicated by values in CTLD 239. If the state indicates that the byte is intended for AD 109, uP 301 places it in ATXQ 247, from whence uP 301 outputs it via DUART 319 to AD 109. If the present state of TERM 103 indicates that the byte is intended for TERM 103, uP 301 determines from its value and the present state of TERM 103 whether it is a character code, a control code, a parameter, or a byte of a command specifier. If it is a character code, uP 301 places the code at a location in DISPM 213 termed the active position. A pointer to the active position is maintained in DISPD 221. If it is a control code, uP 301 changes state in CTLD 239 or DISPD 219 as required; if it is a parameter byte, uP 301 places it in COMB 251. If it is a command specifier, uP 301 executes the specified command using the parameters. While uP 301 is executing commands, DC 315 operates as described above to display the lines from DISPM 213 specified by the rowtable.

In response to a byte from KB 107, KBP 317 generates an interrupt, as previously explained. The interrupt handling routine places the byte in KEYB 249, uP 201 then examines it, and in most cases, places it in TRXQ 240, from whence it goes to HTXQ 243 for transfer to HOSTPRS 225. DUART 319 then transmits it to HOST 101. Essentially the same sequence of events occurs with a byte from AUXP 227, except that in that case, the interrupt handling routine moves the byte to ARXQ 245, where it is examined and in most cases, moved to HTXQ 243, from whence it is transmitted to HC 101 as just described.

Figure 4:
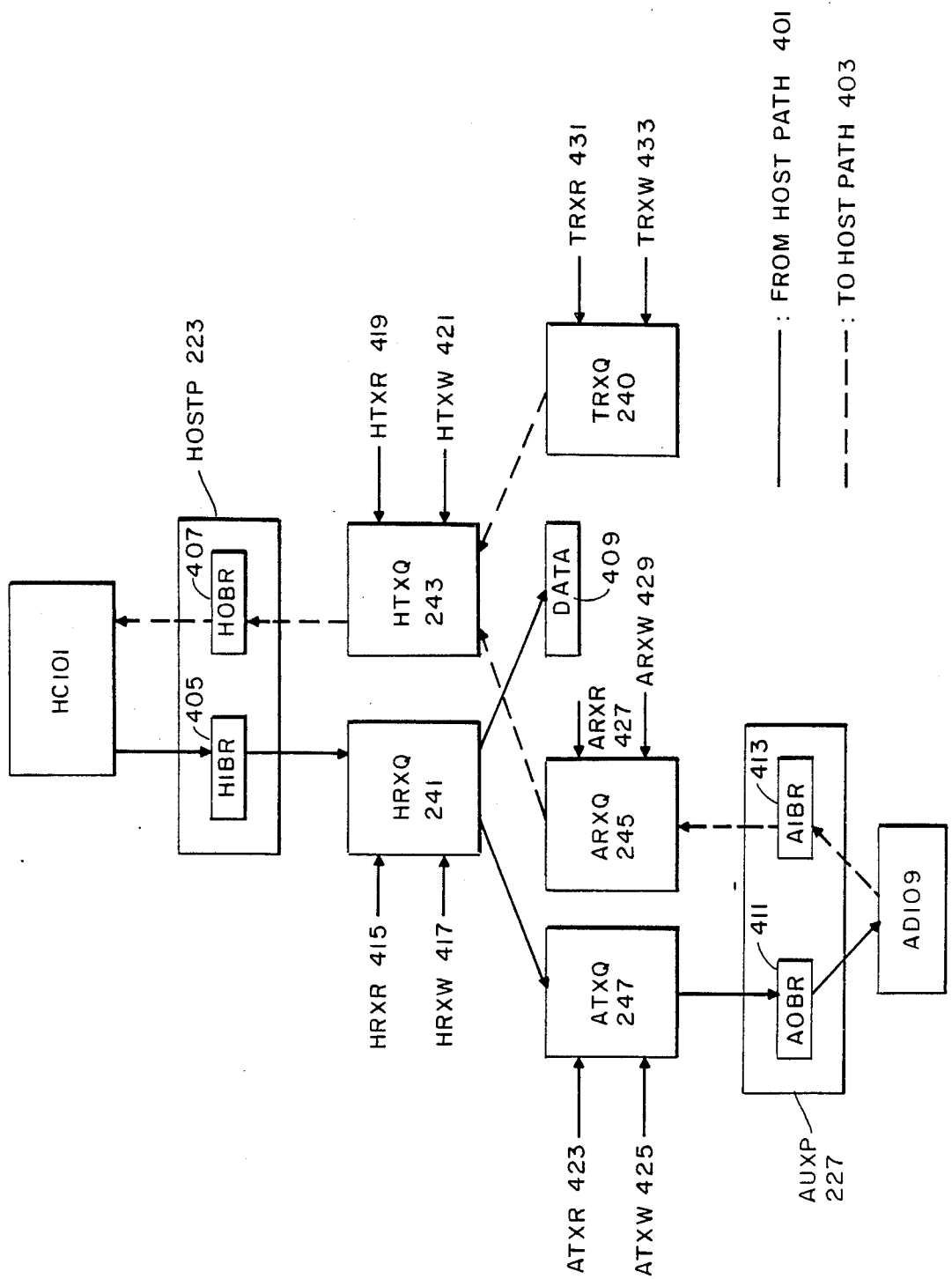
FIG. 4, titled "Schematic of Paths between HC 101, TERM 103, and AD 109", is a schematic diagram of data transfer paths in the improved terminal.

4. Data Transfer paths between HC 101 and TERM 103 or AD 109: FIG. 4

A feature of TERM 103 is that HC 101 can select either TERM 103 or AD 109 as the destination of the data it transfers to TERM 103 and independently select either TERM 103 or AD 109 as the source of the data it receives from TERM 103. In the following, the paths by which data may be transferred between TERM 103, AD 109, and HC 101 are described. Then the discussion explains how paths are selected, how the flow of data on them is controlled, and how TERM 103 and AD 109 are each guaranteed access to HC 101.

FIG. 4 is a schematic drawing of the paths by which data may be transferred between HC 101 and TERM 103 or AD 109. Dashed lines in the figure indicate the path 403 for data sent to HC 101 and solid lines indicate the path 401 for data received from HC 101.

Beginning with path 401 from HC 101, data bytes on that path move from HC 101 to host input byte register (HIBR) 405, one of HOSTPRS 225, in HOSTP 223. As previously explained, HOSTP 223 generates an interrupt and uP 201 transfers the received byte to the tail of a queue in HRXQ 241. The tail of the queue is indicated by HRXW pointer 417. What happens next depends on whether TERM 103 or AD 109 has been selected as the destination for the byte. In the former case, when the byte reaches the head of the queue, indicated by HRXR pointer 415, uP 201 moves the byte from HRXQ 241 to DATA 409, a variable in CTLD 239 which is used to store the byte while it is processed. uP 201 then processes the byte as determined by the byte's value and the state of TERM 103. If AD 109 has been selected as the destination, uP 201 moves the byte from HRXQ 241 to the tail of ATXQ 247, indicated by ATXW pointer 425, and when the byte reaches the head of ATXQ 247, indicated by ATXR pointer 423, uP 201 moves the byte from there to auxiliary output byte register (AOBR) 411, one of the registers of AUXPRS 229. In response thereto, AUXP 227 transmits the data byte to AD 109.

Continuing with path 403 to HC 101, when the source of data on that path is AD 109, AUXP 227 receives the data a byte at a time from AD 109. Each byte is received in auxiliary input byte register (AIBR) 413 and when AUXP 227 receives the byte, it generates an interrupt to uP 201. uP 201 moves the byte to the tail of the queue in ARXQ 245, indicated by the pointer ARXW 429. When the byte reaches the head of the queue, indicated by the pointer ARXR 429, uP 201 moves the byte to the tail of the queue in HTXQ 243, indicated by the pointer HTXW 421. When the byte reaches the head of the queue, indicated by the pointer HTXR 419, uP 201 moves it to host output byte register (HOBR) of HOSTPRS 225 together with a transmit command, and HOSTP 223 responds to the command by transmitting the byte to HC 101. When the source of data is the terminal, uP 201 has placed the data byte in terminal receive queue (TRXQ) 240. Bytes placed in TRXQ 240 go to the tail of the queue, marked by the pointer TRXW 433, and uP 201 reads bytes from the head of the queue, marked by TRXR 431, to the tail of the queue in HTXQ 243, from whence they are transmitted as described above.

Bytes on path 401 whose destination is AD 109 are interpreted in TERM 103 only when they affect the path. The only codes which fall into this category are INT and NULL, the flow control codes XON and XOFF, and the command CSI 4 i, which changes the destination of path 401 to TERM 103. These codes are detected and processed in a preferred embodiment by the interrupt code which responds to the interrupt from HOSTP 223 when the byte is received.

Figure 5:
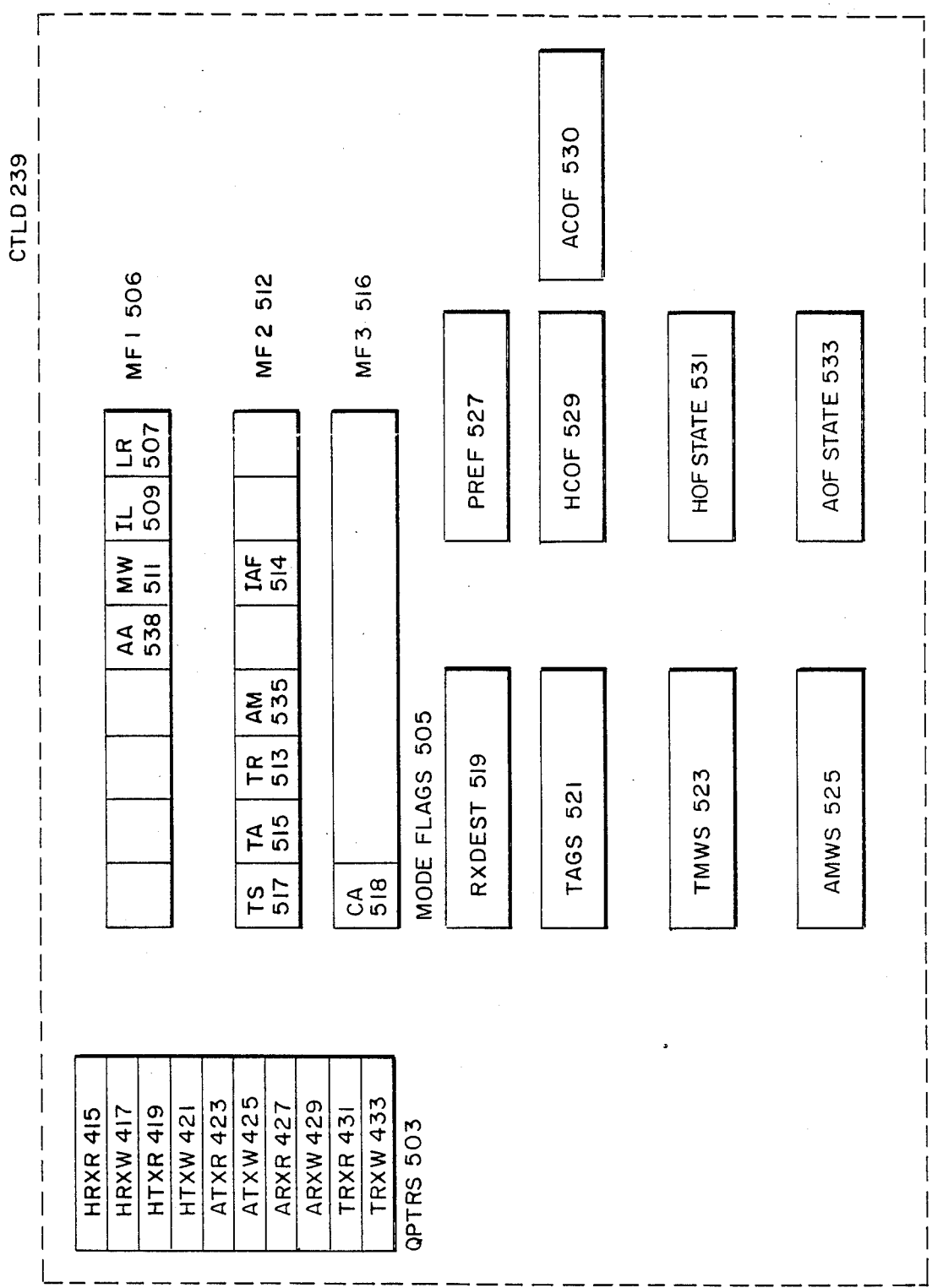
FIG. 5 titled "Control Data 501 for Data Transfer Paths 401 and 403", is a diagram of control data for the data transfer paths.

5. Control of Data paths 401 and 403: FIGS. 5–7

Data paths 401 and 403 are controlled by means of protocols sent between HC 101 and TERM 103. In response to these protocols, up 201 sets certain variables in CTLD 239 and controls TERM 103 as determined by the values of the variables. The protocols and the variables set by them control the source and destination of data being transferred, the flow of data on a path, and access to a path by the TERM 103 and AD 109 respectively. The variables are shown in FIG. 5 and the protocols and modes are shown in FIGS. 6 and 7.

The discussion begins with an overview of protocols in TERM 103. The mode protocols, shown in FIG. 6, are typical command protocols for TERM 103. As can be seen from protocols 601 and 603, all command protocols begin with a command sequence indicator (CSI) byte, which has the hexidecimal (X) value X'9B'. The mode protocols are private extensions of the ANSI standard, and this fact is indicated in these protocols by the next byte, which contains the ASCII code for the ">" character, indicating a private extension. In other command protocols, a private extension is indicated by a private command specifier. Then come the parameters, in this case, bytes containing ASCII codes for decimal representations of numbers indicating the modes which are to be set or reset by the command. Each parameter is separated from the next by the ASCII code for the ";" character. The last byte in the command contains the command specifier, in the case of protocol 601, the ASCII code for "h" and in the case of protocol 603, the ASCII code for "1". Further protocols are shown in FIG. 7. Data transfer control codes 702 are simply byte codes with the hexidecimal values shown; data transfer commands are ANSI standard commands, and therefore lack either the byte containing the code for ";" or a private command specifier. Except as previously described, uP 201 responds to the protocols only when TERM 103 is the destination of data from HC 101. In the case of the control codes, uP 201 responds directly to the control code to carry out the action indicated by the control code. In the case of the commands, uP 201 collects the parameters and command specifier in COMB 251 and then executes the specified command using the parameters.

Beginning with the source and destination of data being transferred, the destination for data on data path 401 may be controlled by means of the data transfer commands CSI 4 i 713 and CSI 5 i 715, shown in FIG. 7. CSI 4 i establishes TERM 103 as the destination of data on path 401, while CSI 5 i establishes AD 109 as the destination. Within CTLD 239, the variable RXDEST 519 indicates the last of commands 713 and 715 received in TERM 103. In response to CSI 4 i 713, uP 201 sets RXDEST 519 to 0; in response to CSI 5 i 715, uP 201 sets RXDEST 519 to 1. When RXDEST 519 has the value 0, uP 201 loads the byte at HRXR 415 in HRXQ 241 into DATA 409 for processing; when RXDEST 519 has the value 1, up 201 loads that byte at ATXW 425 in ATXQ 247.

The source of data received by HC 101 is controlled by the setting of the transmit source (TS) mode. When the TS mode is reset, TERM 103 is the source; when the mode is set, AD 109 is the source. The TS mode may be set or reset either by means of the mode protocols shown in FIG. 6 or as a side effect of CSI 4 i 713 and CSI 5 i 715. The latter occurs only when the link routing mode (LR) is set. When that is the case, the source and destination routes are linked so that they are both to either TERM 103 or AD 109 and both change together in response to CSI 4 i 713 and CSI 5 i 715. When the LR mode is reset, CSI 4 i 713 and CSI 5 i 715 affect only path 401.

The TS and LR modes are controlled by bits in mode flags 505 in CTLD 239. The TS mode is controlled by TS bit 517 in the variable mode flags 2 (MF2) 512 of flags 505; the LR mode is controlled by LR bit 507 in the variable mode flags 1 (MF1) 506; both are set and reset by uP 201 in response to the mode protocols shown in FIG. 6. Thus, when uP 201 receives set mode protocol 601 with parameter 33 for the link routing mode, it responds thereto by setting LR bit 507, and when it receives protocol 601 with parameter 32 for the transmit source mode, it sets TS bit 517. uP 201 resets the bits when it receives parameter 32 or 33 in reset mode protocol 603. When LR bit 507 is set and uP 201 receives a CSI 4 i protocol, uP 201 further responds to LR bit 507 by resetting TS 517 and to CSI 5 i by setting TS 517. When TS 517 is reset, uP 201 responds to the presence of a byte in TRXQ 240 by moving it to HTXQ 243 for transmittal to HC 101; when TS 517 is set, uP 201 responds to the presence of a byte in ARXQ 245 by moving it to HTXQ 243.

Thus, by means of set mode protocol 601, reset mode protocol 603, CSI 4 i protocol 713, and CSI 5 i protocol 715, a program executing on HC 101 can specify any of four possibilities for paths 401 and 403:

AD 109 as both source of and destination for data transferred between TERM 103 and HC 101;

TERM 103 as both source of and destination for data transferred between TERM 103 and HC 101;

AD 109 as the source and TERM 103 as the destination for data transferred between TERM 103 and HC 101; and TERM 103 as the source and AD 109 as the destination for data transferred between TERM 103 and HC 101.

To ensure rapid switching of path 403 from AD 109 to TERM 103 response to a change in TS 517, ARXQ 245 may transfer bytes to HTXQ 243 only when HTXQ 243 contains less than 32 characters and the transfer will stop when the number of bytes in HTXQ 243 reaches 32. Consequently, HTXQ 243 will never contain more than 32 bytes of data from AD 109.

6. Flow Control on paths 401 and 403: FIGS. 5-7

The queues in paths 401 and 403 have only a limited capacity. In TERM 103, HRXQ 241, HTXQ 243, ATXQ 247, and ARXQ 245 each have a maximum capacity of 256 bytes. Similarly, HC 101 or AD 109 may have limited buffer space for receiving transmissions from TERM 103. Consequently, it is necessary to control the flow of data between HC 101 and TERM 103 and between TERM 103 and AD 109 to ensure that HC 101 does not send data to TERM 103 when there is no room in HRXQ 241 or ATXQ 247 and AD 109 does not send data to TERM 103 when there is no room in ARXQ 245 or HTXQ 243 and that TERM 103 does not send data to HC 101 or AD 109 when they have no room for it. As shown in FIG. 7, the ANSI standard protocols include two flow control protocols sent by the device receiving data to the device providing data to indicate whether the device providing data should start or stop transmitting. XON protocol 703, which has the value X'11', indicates that the device providing the data may start transmitting. XOFF protocol 705, which has the value X'13', indicates that the providing device must cease transmitting.

TERM 103 has a set uP mode which permits a user of the terminal to specify matters including whether TERM 103 will provide XON/XOFF protocols to HC 101 and respond to those protocols from HC 101 and whether TERM 103 will provide XON/XOFF protocols to AD 109 and respond to those protocols from AD 109. In the set uP mode, up 201 executes a program which provides menus indicating the set up options to the users and which then sets variables in CTLD 239 according to the options chosen by the users. The variables set in set uP mode may be copied to NVRAM 311, where they are retained during periods when TERM 103 is turned off. In a preferred embodiment of TERM 103, the variables governing generation of and response to XON/XOFF are HCOF 529, which indicates whether TERM 103 is to respond to XON/XOFF protocols from HC 101 and provide them to HC 101, and ACOF 530, which indicates whether TERM 103 is to respond to XON/XOFF protocols from AD 109 and provide them to AD 109.

When these variables specify automatic XON/XOFF for either port, the effect on incoming XON/XOFF protocols is the following: the interrupt code which responds to interrupts from the port checks for and responds to XON/XOFF codes; otherwise, it does not. When an XOFF code is encountered in HIBR 405, the interrupt code sets a variable to indicate that fact in HOFSTATE 531; as long as that variable indicates XOFF, no bytes are transmitted from HTXQ 243; when an XON protocol is encountered, the variable is reset and transmission resumes. XOFF and XON protocols received in ARXQ 245 are handled the same way, except that the variable set is in AOFSTATE 533 and the queue affected is ATXQ 247. Since checking for XON/XOFF is done by the interrupt code, TERM 103 responds to the protocols even though ARXQ 245 or HRXQ 241 is full.

The effect regarding outgoing XON/XOFF protocols is the following: the code which manages HRXQ 241, ATXQ 247, ARXQ 245, and HTXQ 243 constantly checks the state of these queues to determine whether an XOFF protocol should be generated and if one has been, whether an XON protocol should be generated. Once an XOFF protocol has been generated to HC 101 or AD 109, TERM 103 keeps on receiving data from the device concerned until the queue which is receiving the data is actually full. At that point, TERM 103 discards further received characters; however, as mentioned above, the interrupt handling code continues to respond to XON, XOFF, INT, and NULL protocols and, as will be explained below, TERM 103 also always responds to a CSI 4 i command. When the queue management code determines that HRXQ 241 or ARXQ 245 can no longer receive data it checks the variables to determine whether automatic XON/XOFF is specified for the port; if it is, the code transmits an XOFF protocol by the relevant port; similarly, the code which uP 201 executes when HRXQ 241 or ARXQ 245 can again receive data checks the variables and transmits an XON protocol by the relevant port if automatic XON/XOFF is specified for the port.

If TERM 103 was set uP with automatic XON/XOFF specified for transfers between HC 101 and AD 109, HC 101 may nevertheless override the set up. HC 101 does so by means of a set mode protocol 601 which has the parameter 39, indicating that flow control protocols and signals from AD 109 are to be ignored by TERM 103. uP 201 responds to parameter 39 in set mode protocol 601 by setting ignore auxiliary flow control (IAF) bit 514 in MF 2 512. When that bit is set, the interrupt code which responds to interrupts in AUXP 227 ignores XON/XOFF and any flow control signals from AD 109 regardless of the setting of ACOF 530. If there is data in ATXQ 247 awaiting an XON protocol from AD 109, that data is sent as soon as the set mode protocol 601 sets IAF bit 514. When the bit is reset by means of reset mode protocol 603, TERM 103 again responds as determined by ACOF 530.

Continuing with the generation of XON/XOFF protocols in TERM 103 when automatic XON/XOFF is set, the manner in which these protocols are generated depends on which path and which destination is involved. With from host path 401, when the destination is TERM 103, generation of XON/XOFF protocols depends only on the state of HRXQ 241. The code which manages HRXQ 241 transmits an XOFF protocol via HOSTP 223 to HC 101 when the values of queue pointers HRXR 415 and HRXW 417 (in QPTRS 503 in FIG. 5) indicate that there are less than 64 empty bytes in HRXQ 241. Once the code has transmitted an XOFF protocol, it waits until the queue pointers indicate that there are fewer than 32 bytes containing data in HRXQ 241 before it transmits an XON protocol to HC 101. Variables indicating the last flow control protocol to be transmitted are contained in HOFSTATE 531.

If the destination of data on path 401 is AD 109, generation of XON/XOFF protocols to HC 101 depends on the state of both HRXQ 241 and ATXQ 247. uP 201 issues an XOFF protocol to HC 101 when either queues lack sufficient space and an XON protocol to HC 101 only when both queues have sufficient space. The code which manages HRXQ 241 and that which manages ATXQ 247 examine queue pointers HRXR 415, HRXW 417, ATXR 423, and ATXW 425 and issue an XOFF protocol if there are either fewer than 64 free bytes in HRXQ 241 or fewer than 96 free bytes in ATXQ 247. Once the code has issued an XOFF protocol, it issues an XON protocol only when ATXQ 247 and HRXQ 241 each contain fewer than 32 characters.

Thus, when HC 101 receives an XOFF, there is either room in HRXQ 241 or room in ATXQ 247. After sending the XOFF, TERM 103 continues receiving bytes in HRXQ 241 and processing the bytes, either consuming them in TERM 103 or sending them to ATXQ 247, depending on whether TERM 103 or AD 109 is the destination. The bytes are further processed significantly faster than they are sent from HC 101 to HRXQ 240. Thus, if HC 101 responds to the XOFF by immediately sending a CSI 4 i 713 protocol to TERM 103, there should be room in HRXQ 241 to receive the protocol. Once received, the protocol is processed by TERM 103 and TERM 103 becomes the destination.

XOFF is generated, there will always be room in HRXQ 241 to receive and process a CSI 4 i 713 protocol making TERM 103 the destination.

Emergency control of TERM 103 by HC 101 is achieved in a preferred embodiment by means of a novel response to the ANSI INT protocol. The response is enabled when the enable interrupt control mode is set. The mode has the parameter 40. As previously indicated, the INT protocol is responded to by the code which responds to the interrupt from HOSTP 223 when a byte is received from HC 101. TERM 103 consequently will respond to INT even when HRXQ 241 is full. When TERM 103 receives the INT protocol and the enable interrupt control mode is set, uP 201 responds to the protocol by immediately clearing HRXQ 241 and ATXQ 247, immediately terminating processing of any command protocol currently being processed, reenabling HRXQ 241 for receipt of data, clearing HTXQ 243 and ARXQ 245, enabling TERM 103 as the destination on path 401 and the source on path 403, and if flow control is enabled, sending XON to HC 101 and a flow control signal to AD 109 to indicate that HRXQ 241 and ARXQ 245 can receive data.

With to host path 403, generation of XON/XOFF protocols to AD 109 is determined by the state of ARXQ 245, as determined from the values of ARXR 427 and ARXW 429. XOFF is generated when ARXQ 245 has fewer than 64 bytes free; XON is generated when ARXQ 245 next contains fewer than 32 bytes of data. State indicating which was last generated is contained in AOFSTATE 533. As previously mentioned, ARXQ 245 transfers data to HTXQ 243 only when HTXQ 243 contains fewer than 32 bytes and transfers no more than 32 bytes at a time.

7. Control of Access to path 403: FIGS. 5-7

A difficulty with placing control of the source of data for to-host path 403 with HC 101 is that the device which is presently not a source for HC 101 may need to communicate with HC 101. For example, if AD 109 is presently the source and a user of TERM 103 inputs data to TERM 103 to which HC 101 must respond, HC 101 will not know that it needs to respond until it issues a command which resets TS 517. TERM 103 uses two approaches to solve this problem: a message waiting enable mode which permits TERM 103 to transmit message waiting control code (MW) X'95' to HC 101 when the source which is not presently transmitting to HC 101 has data to transmit and an interleaving mode which permits TERM 103 to interleave data from the terminal with data from AD 109 when TS 517 specifies AD 109 as the source of the data being transmitted. The two modes are mutually exclusive, i.e., no MW protocol will be sent when TERM 103 is in interleaving mode.

The modes are controlled by bits in MF1 506 and MF2 512 and are set and reset by set mode protocol 601 and reset mode protocol 603. The message waiting enable mode is controlled by MW bit 511 of MF1 506; the parameter used to set or reset the mode is 35; the interleaving mode is controlled by IL bit 509 in MF1 506; its parameter is 34. A third mode, the tag mode, is used together with the interleaving mode to specify that a tag code be inserted in front of a sequence of bytes to indicate whether the bytes are from TERM 103 or AD 109. The mode is controlled by TA bit 515 in MF2 512 and its parameter is 31.

Beginning with the message waiting enable mode and taking the situation in which AD 109 is the source of data in path 403, when MW bit 511 is set, the code which manages TRXQ 240 branches when the pointers in the queue indicate that it contains a byte. The code to which it branches examines MW bit 511, and if it is set, further examines the variable TMWS 523, which is set when the MW protocol is sent, thus preventing repeated sending of the protocol. If TMWS 523 is not sent, the code outputs the MW code to HTXQ 243. When HC 101 receives the MW code and responds with a command which resets TS bit 517 so that the terminal is the source, the code which executes the command resets TMWS 523. When TERM 103 is the source of data on path 403 and a byte from AD 109 appears in ATXQ 247, the procedure outlined above is followed, except that the variable which is checked before sending the MW protocol, set after it is sent, and reset when TS 517 is set to specify AD 109 as the source is AMWS 525.

Continuing with the interleaved mode, that mode is effective only when TS bit 517 specifies that AD 109 is the source. When IL mode 509 is set, data from TERM 103 is interleaved with data from AD 109; when it is reset, the data comes solely from AD 109. Interleaving is managed as follows: when the source which is not presently transmitting has data, the transmitting source is permitted to transfer only a limited number of bytes more from its queue to HTXQ 243. When AD 109 is the transmitting source, it is permitted to transfer bytes from ARXQ 245 to HTXQ 243 until it has transmitted 20 more bytes or until ARXQ 245 is empty, whichever happens first. When TERM 103 is the transmitting source, it is permitted to transfer bytes from TRXQ 240 to HTXQ 243 until TRXQ 240 is empty when TRXQ 240 contains less than 20 characters, until it has transmitted 20 bytes, or if the 20 bytes include the beginning of a protocol, until the protocol is finished. Transmitting complete protocols is permitted in order to simplify handling of protocols in HC 101. If TA 515 indicates that tags are to precede series of bytes from TERM 103 and AD 109, an X'12' code is placed in HTXQ 243 ahead of a series from TERM 103 and an X'14' code ahead of a series from AD 109.

In TERM 103, switching from one source to another is controlled by a counter maintained in one of the registers of uP 201 and the variable TAGS 521, whose value indicates the source of the data presently being transmitted to HC 101. When IL 509 is set and a switch has been made, TAGS 521 is set to indicate the new source and the counter begins counting. When 20 bytes have been output from the source queue to HTXQ 243, when the source queue is empty, or in the case of TRXQ 240, the protocol has been finished, TAGS 521 is examined to determine the current source, the source is switched, TAGS 521 is set to indicate the new source, the counter is reset, and transfer from the new source queue to HTXQ 243 begins. If TA 515 indicates that tags are in use, the tag for the source indicated by the new value of TAGS 521 is put at the tail of HTXQ 243 before transmission from the new source to HTXQ 243 begins.

8. Transparency Mode

Single-byte ANSI codes may contain 7 or 8 significant bits. Since ANSI codes may be employed in environments in which only 7 significant bits can be transmitted and in environments in which devices employ 8-bit non-ANSI codes, there is an ANSI code consisting of a prefix and a code value corresponding to each possible 8-bit code. A transparency mode in TERM 103 automatically converts 8-bit codes to their prefix and code equivalents and vice-versa. The conversion consists of subtracting a value from the 8-bit code to produce a new code and then adding a prefix. The kind of prefix depends on whether the data link between HC 101 and TERM 103 transfers 7 or 8 bit codes. In the former case, the prefix is two 7-bit codes; in the latter case, the prefix is a single 8 bit code. The value of the prefix and the value subtracted from the original code depend on the value of the 8-bit code being converted. The rule is the following:

| 8-bit Code Value | Prefix and Code Equivalent | |
|---|---|---|
| X'20' thru X'7E' | No prefix or code change needed | |
| X'7F' thru X'DC' | PREF2 | CODE - X'5E' |
| X'DD' thru X'1F' | PREF3 | CODE - X'BC' |

With the 8-bit data link, PREF2 has the value X'8E' and PREF the value X'8F'; with the 7-bit data link, PREF2 has the value ESC X'4E' and PREF3 has the value ESC X'4F'.

Transparency mode is controlled by transparency mode parameter 30 in set mode protocol 601 and reset mode protocol 603; the current setting is retained in TR bit 513 of MF2 512. The value of the variable PREF 527 indicates whether PREF2 or PREF 3 is required. When data is being transferred from HC 101 to AD 109 and TR bit 513 indicates that the transparency mode is set, uP 201 watches for FREF 2 and PREF 3 when it transfers codes from HRXQ 241 to ATXQ 247. If it encounters a prefix, it does not transfer the prefix to ATXQ 247, but instead waits for the code following the prefix, performs the operation on the code specified by the prefix, and then transfers the resulting code to ATXQ 247.

uP 201 detects the two-byte prefixes by watching for ESC as it transfers codes from HRXQ 241 to ATXQ 247. If one is received, up 201 watches for either X'4E', to which it responds by setting PREF 527 to indicate PREF2, or X'4F', to which it responds by setting PREF 527 to indicate PREF3. uP 201 detects the single-byte prefixes by watching for X'8E' and X'8F'. uP 201 responds to X'8E' by setting PREF 527 to indicate PREF2 and to X'8F' by setting PREF 527 to indicate PREF3. The prefixes are not transferred to ATXQ 247, and when uP 201 transfers the next code, it determines from the value of PREF 527 and the value of the code whether it should add X'5E' or X'BC' to the code's value. uP 201 then transfers the result of that operation to ATXQ 247.

When data is being transferred from AD 109 to HC 101 and transparency mode is enabled, uP 201 performs the reverse conversion as it transfers codes from ARXQ 245 to HTXQ 243. If the code's value is in the range X'20' to X'7E', uP 201 simply transfers the code; if the code's value is in the range X'7F' to X'DC', uP 201 sets PREF 527 to indicate PREF2; if it is in the range X'DD' through X'1F', uP 201 sets PREF 527 to indicate PREF3. If PREF2 is indicated and there is a 7-bit link between HC 101 and TERM 103, uP 201 places ESC and H'4E' in HTXQ 243, subtracts X'5E. from the code, and then places the result in HTXQ 243. If PREF3 is indicated and there is a 7-bit link, uP 201 proceeds as described, except that it places ESC and H'4F' in HTXQ and subtracts X'BC'. If there is an 8-bit link, uP 201 places X'8E' and the code minus X'5E' in the buffer when PREF2 is indicated and X'8F' and the code minus X'BC' when PREF3 is indicated.

Figure 8:
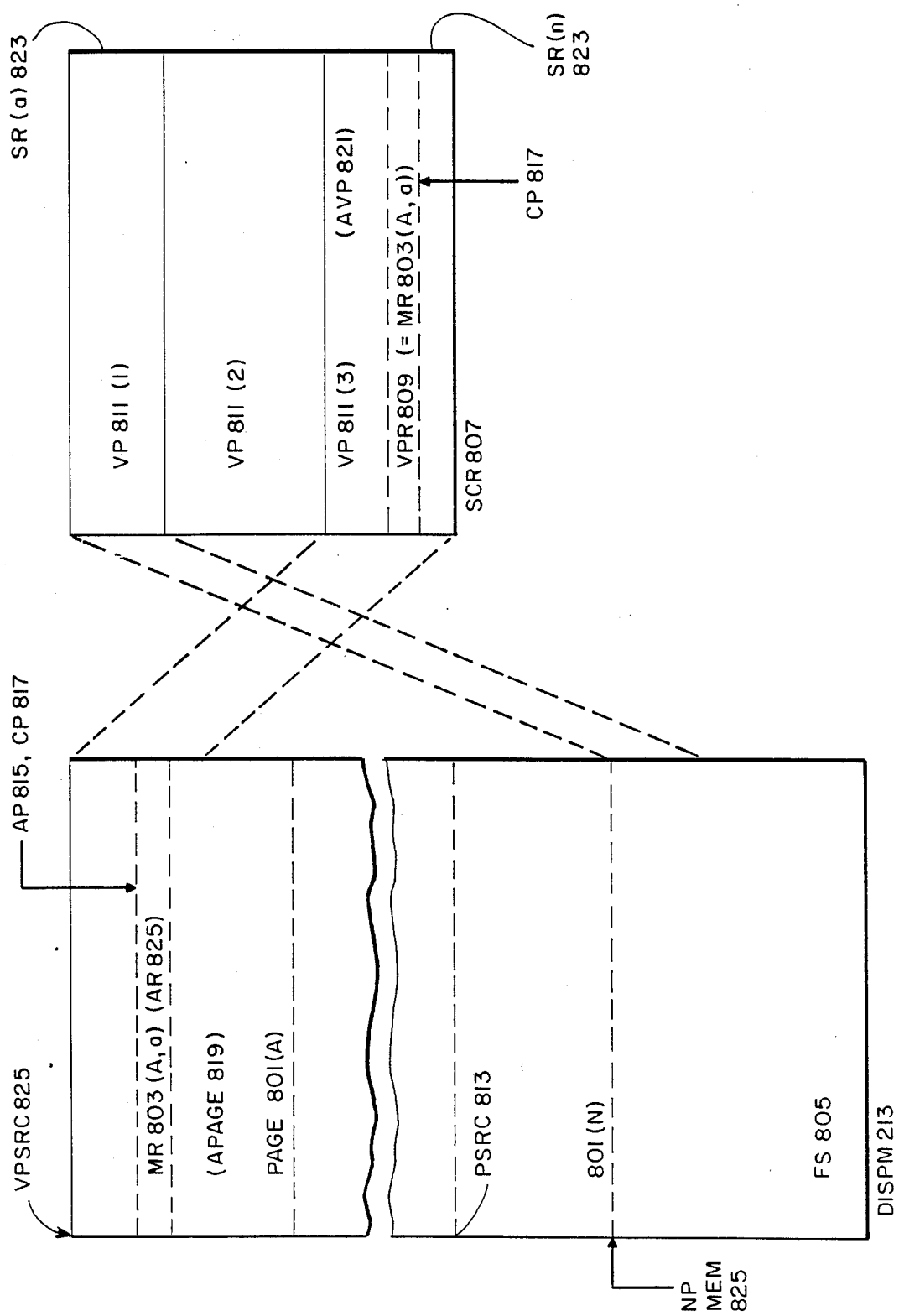
FIG. 8, titled "Overview of Pages and Viewports in TERM 103", is a logical overview of pages and viewports in the improved terminal.

9. Logical Overview of pages and Viewports in TERM 103 : FIG. 8

As previously mentioned, display memory (DISPM) 213 in TERM 103, which contains the character codes and corresponding attribute codes from which the display on DISP 105 is produced, may be divided into a number of pages. Moreover, DISPG 211 can generate a display on DISP 105 which consists of rows from more than one of the pages. The displayed rows from any one of the pages make uP a viewport into the page. The logical relationships between pages in DISPM 213 and viewports on DISP 105 is shown in FIG. 8.

As shown in that figure, DISPM 213 may be divided into a number of pages 801(A) through (N). In TERM 103, the maximum number of pages is 8. Each page 801 has a specified number of rows and a specified number of columns. The product of the number of rows and columns in the page 801 is the number of display positions for the page 801 in DISPM 213. The sum of the display positions in all the pages 801 may not exceed the total number of display positions in DISPM 213, but any page 801 may have a number of display positions ranging from 0 to all of the display positions. The beginning of each page 801 in DISPM 213 which contains a number of display positions other than 0 is indicated by page starting row and column (PSRC) 813. Page number and page position are not related, i.e., page 801(A) may have any number from 1 through 8. The pointer active position (AP) 805 marks the point in DISPM 213 at which operations other than the display of the contents of DISPM 213 on DISP 105 are being performed. The row in which AP 805 is currently located is active row (AR) 825, and the page in which AP 815 is located is active page (APAGE) 819. AP 815 is generally also the location of cursor position (CP) 817, the location at which the cursor will appear on the display, but TERM 103 has a mode which permits the separation of AP 815 from CP 817. If the pages 801 presently in DISPM 213 do not require all of the display positions in DISPM 213, the pointer new page memory (NP MEM) 825 marks the end of the last page and the beginning of free space (FS) 805.

Screen (SCR) 807 of DISP 105 has a fixed number of rows (SR 823). The width of the rows in a screen may be set to either 80 or 132 columns. The fixed number of rows may be divided into a number of viewports (VP) 811. Each VP 811 occupies a number of consecutive rows in SCR 807. The number of rows occupied by all the VPs 811 may not exceed the number of rows in SCR 807, but a given VP 811 may have any number of view port rows (VPRs) 809 rows from none to the total number of SRs 823 in SCR 807. VPs 811 may not overlap, and all VPs 811 which are defined for SCR 807 and which have a number of VPRs 809 larger than 0 are simultaneously displayed on SCR 807. VPs 811 are numbered, and a VP 811's number determines its position relative to the other VPs 811 on SCR 807. Thus, in SCR 807 of FIG. 8, three VPs 811 are defined, with VP 811(1) appearing as the topmost VP 811 on SCR 807, VP 811(2) as the next VP 811, and VP 811(3) as the last VP 811 on SCR 807. In TERM 103, SCR 807 has 27 SRs 823. Rows 2 through 26 are actually displayed, and rows 1 and 27 are maintained for scrolling purposes.

Each page 801 may have a single VP 811 assigned to it. Any VP 811 may be assigned to any page 801; thus, in FIG. 8, VP 811(1) is assigned to page 801(N) and VP 811(3) is assigned to page 801(A). The VP 811 assigned to a page 801 functions as a "window" which can display as many rows and columns from the page as there are rows and columns in the VP 811. Presuming that VP 811(3) has four VPRs 809, then four MRs 803 from page 801(A) may be displayed in VP 811(3). A VP 811 may be moved within the confines of the page 801 to which it is assigned. The row and column in page 801 which indicate the position of the upper left-hand corner of VP 811 are specified by vp start row and column (VPSRC) 825. In FIG. 8, VP 811(3) displays rows 1–4 of page 801(A) beginning with column 1, and consequently, VPSRC 825 is row 1, column 1. If CP 817 is in a MR 803 displayed in a VP 811, the cursor appears in VPR 809 corresponding to the MR 803 containing CP 817 at a position in VPR 809 corresponding to the position indicated by CP 817. If there are fewer columns in a MR 803 displayed in a VP 811 than in the corresponding VPR 809, the extra columns are displayed as blanks; similarly, if a VP 811 is positioned in such fashion that it extends beyond the bottom of page 801 to which it is assigned, the VPRs 809 which have no corresponding MRs 803 in the page are displayed as blanks. The VP 811 in which MR 803 containing AP 815 is displayed is termed active viewport (AVP) 821.

Initial assignment of VPs 811 to pages 801 and positioning of VPs 811 in the pages 801 to which they are assigned is done by means of terminal initialization defaults and explicit viewport to page assignment protocols. Additionally, two modes which are settable by protocol permit a VP 811 to follow changes in AP 815. The first of these is auto map mode, which permits a VP 811 to follow AP 815 from one page to another. When TERM 103 is in auto map mode and AP 815 moves out of one page 801(x) displayed in VP 811(a) and into a different page 801(y), VP 811(a) is reassigned to page 801(y). If another VP 811(b) was assigned to page 801(y), that VP 811(b) is deassigned when VP 811(a) is reassigned.

The second mode is auto alignment mode, which permits VP 811 to follow AP 815 within a page. When TERM 103 is operating in auto alignment mode and AP 815 moves out of the portion of the page 801 currently being displayed in VP 811 assigned to the page 801 containing AF 815, VP 811 is automatically repositioned vertically and horizontally so that the MR 803 currently containing AP 815 is one of the VPRs 809 in the assigned VP 811 and AP 815 is in one of the columns displayed in VP 811. If AP 815 moves out of the page 801 to another page which has a VP 811 assigned to it when TERM is in auto alignment mode, the VP 811 for that page becomes the new active VP 811 and is automatically positioned so that MR currently containing AP 815 is one of the VPRs 809. If both auto map and auto alignment are enabled, VP 811 follows AP 815 from one page to the next, is assigned to the new page, and aligns itself in the new page 801 so that AP 815 is within VP 811. Any VP 811 formerly assigned to the new page is deassigned.

As may be seen from the above description of the relationship between VPs 811 and pages 801, situations may arise in which there is no mapping between all or part of a VP 811 and MRs 803. The situations are the following:

VP 811 is not presently assigned to a page 801;

VP 811 is assigned to a page 801, but there is no such page 801 in DISPM 213;

VP 811 contains more VPRs 809 than there are MRs 803 in the page 801 to which it is assigned; and VP 811 is positioned in such fashion that there are fewer MRs 803 being displayed from page 801 than there are VPRs 809 in VP 811.

In all of these cases, the VPRs 809 for which there are no corresponding MRs 803 appear as blank lines. Thus, in FIG. 8, if VP 811(2) is not presently assigned to a page 801, all of its VPRs 809 appear as blank lines.

10. Implementation of Pages and Viewports in TERM 103: FIGS. 9-12

Pages, viewports, and the mappings of viewports to the pages and to screen 807 are defined by means of data structures in DISPD 221 of TAS 203. These data structures are in turn manipulated by the protocols and mode settings which HC 101 uses to control pages, viewports, and the display on screen 807. The following will first discuss the data structures and then the protocols and mode settings and their effects on the data structures.

Figure 9:
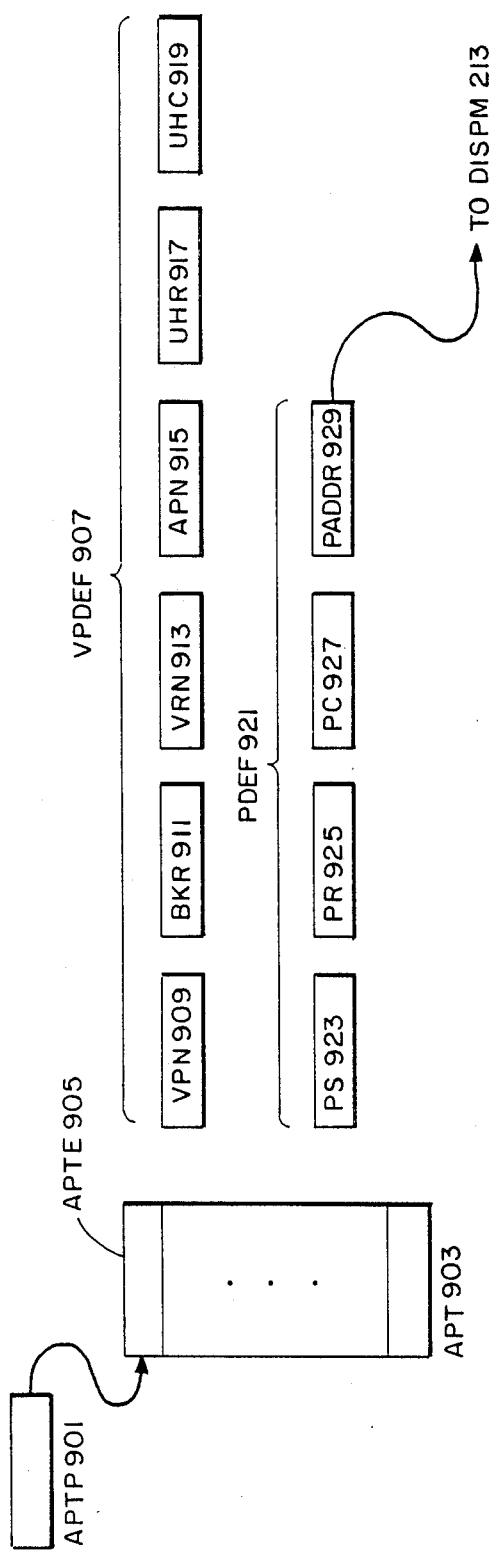
FIG. 9, titled "Data Structures Defining Pages 801 and Viewports 811", is a diagram of data structures defining pages and viewports in the improved terminal.

Beginning with FIG. 9, that figure shows the data structures by means of which pages 801 and VPs 811 are defined in TERM 203. The data structures include active page table (APT) 903, which includes an entry (APTE) 905 for each of the 8 pages into which DISPMEM 213 may be divided and, corresponding to each APTE 905, a page definition data structure (PDEF) 921 which defines the page represented by the corresponding APTE 905 and a virtual page definition data structure (VPDEF) 907 which defines the VP 811 currently assigned to the page represented by the corresponding APTE 905.

APT 903 is located by means of APT pointer (APTP) 901, which contains the address of APT 903 in TAS 203. An APTE 905 for a defined page 801 contains the page number of the page 801 which it represents; the APTEs 905 are in the order in APT 903 in which the pages they represent were defined. APTEs 905 which do not represent pages 801 all have the value 0.

PDEF 921 for the page 801 represented by an APTE 903 is part of a larger data structure which contains PDEFs 921 and VPDEFs 907 for up to 8 pages 801. The position of PDEF 921 for a given page 801 in the larger data structure corresponds to the position of that page 801's APTE 905 in APT 903. PDEF 921 for the given page 801 contains four entries:

PS 923 indicates whether the page 801 represented by PDEF 921 has rows allocated to it in DISPM 213;

PR 925 indicates the number of rows in the page 801;

PC 927 indicates number of columns in the page 801; and

PADDR 929 is a pointer to the address in DISPM 213 at which the page 801 starts.

PDEF 921 thus specifies the size (PR×PC) of the page 801 and its location in DISPM 213.

VPDEFs 907 for the 8 possible VPs 811 are arranged in the order in which the VPs 811 occur on SCR 807. VPDEF 907 for the VP 811 assigned to the given page 801 contains 6 entries:

VPN 909 is the number of the VP 811 on SCR 807;

BKR 911 is the number of blank VPRs 809 in VP 811;

VRN 913 is the number of VPRs 809 in VP 811;

APN 915 is the number of page 801 to which VP 811 is assigned;

VHR 917 is the "home row" of VP 811 in the page 801 to which it is assigned, i.e., the row specified when VP 811 was assigned to page 801; and VHC 919 is the "home column" of the VP 811 in the page 801 to which it is assigned.

The entries in VPDEF 907 thus completely define the size and location of VP 811 on SCR 807 and the relationship at the time of assignment between VP 811 and the page 801 to which it is assigned.

Figure 10:
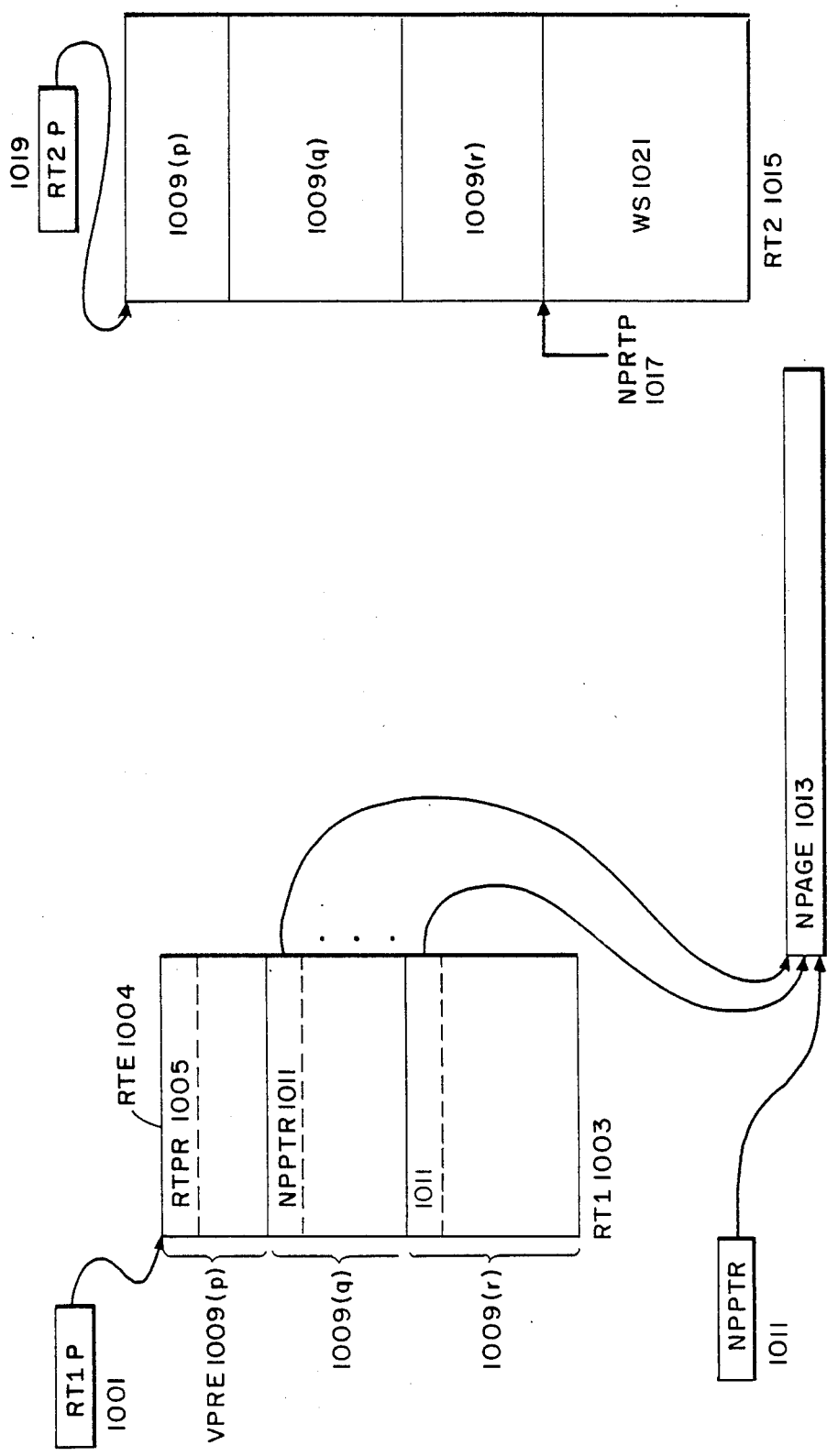
FIG. 10, titled "Data Structures Defining Screen 807", is a diagram of data structures defining a screen in the improved terminal.

Screen 807 is defined by the data structures shown in FIG. 10. As previously explained, display generator (DISPG) 211 in TERM 103 includes display controller (DC) 315, and DC 315 operates by receiving a pointer to a row table containing pointers to MRs 803 in DISPM 213, and then repeatedly fetching the pointer in a table entry, displaying the MR 803 indicated by the pointer, and then fetching the pointer in the next entry and doing the same.

The row table in a preferred embodiment of TERM 803 is RT1 1003. The location of RT1 1003 is specified by the pointer RT1P 1001. RT1 1003 contains 27 RTEs 1004, one for each screen row (SR) 823 in SCR 807. RT1 1003 is further subdivided into view port row entries (VPREs) 1009, one for each VP 111 which has at least one view port row (VPR) 809. The VPRE 1009 for a given VP 111 contains as many RTEs 1004 as there are VPRs 809 in the VP 111 and the RTEs 1004 are in the same order as their corresponding VPRs 809. The VPREs 1009 have the same order in RT1 1003 as their corresponding VPs 111 have on SCR 807.

As indicated in the discussion of the logical structure of pages 801 and VPs 811 in TERM 103, there may not be a corresponding MR 803 for a VDR 809. When this occurs, blanks are displayed in the SR 823 corresponding to that VPR 809. RT1 1003 is part of the arrangement by which the blanks are displayed; the remainder of the mechanism is also shown in FIG. 10. A row of DISPM 213 which is written by uP 201 only on initialization is defined to be null page (NPAGE) 1013. On intialization, NPAGE 1013 is written with blanks having default attributes. Null page pointer (NPPTR) 1011 in DISPD 221 indicates the address of NPAGE 1013. Whenever a VPR 809 has a corresponding MR 803, the RTE 1004 corresponding to the VPR 809 contains RPTR 1005 to the MR 803 corresponding to the VPR 809; whenever a VPR 809 has no such corresponding MR 803, the corresponding RTE 1004 contains NPPTR 1011. Consequently, when DC 315 uses RT1 1003 to generate SCR 807, whenever RTE 1004 contains NPPTR 1011, DC 315 displays the row of blanks defined by NPAGE 1013. NPAGE 1013 and NPPTRs 1011 in RT1 1003 thereby make it possible to define pages 801 and viewports 811 independently of each other and to assign viewports to pages without concern for the consequences when a VPR 809 has no corresponding MR 803.

RT2 1015 is a copy of RT1 1003 with addional work space (WS) 1021 which is used to rebuild RT1 1003 when a VP 811 is defined, redefined, assigned, or reassigned, or when a VP 811 changes its position in page 801 to which it is assigned. When any of the above occurs, or any other change needs to be made in RT1 1003, the row table is rebuilt in RT2 1015 and then copied in its entirety into RT1 1003. Changes in the row table are consequently not displayed on SCR 807 until the changes are complete. RT2 1015 is located by means of RT2P 1019 and NPRTP 1017 points to the beginning of work space (WS) 1021 in RT2 1015.

Data required for manipulation of active position (AP) 815, cursor position (CP) 817, active row (AR) 825, active page (APAGE) 819, and active view port (AVP) 821 are maintained in active page data structure 1101, shown in FIG. 11.

The first two fields indicate the locations of free space in DISPM 213 and RT2 1015:

NPMEM field 825 contains NPMEM pointer 825, which points to the beginning of free space 805 in DISPM 213;

NPRTP field 1015 contains NPRTP pointer 1017, which points to the beginning of work space 1021 in RT2 1015;

The next set of fields specifies APAGE 819, AVP 821, AP 815, and CP 817:

APN 1103 is the number of active page 819;

AVPN 1105 is the number of active view port 821;

ACN 1107 is the number of the column in the active page in which AP 815 is presently located;

ARN 1109 is the number of the row in the active page in which AP 815 is presently located;

ARS 1111 is a pointer to the start of active row (AR) 825;

ARE 1113 is a pointer to the end of AR 825;

APA 1115 is a pointer to AP 815;

CPA 1117 is a pointer to CP 817;

The remaining fields locate APAGE 819 in DISPM 213 and AVP 821 in APAGE 819:

PTP 1119 is a pointer to the top of APAGE 819;

PBP 1121 is a pointer to the bottom of APAGE 819;

VPHC 1123 is the home column of AVP 821 in APAGE 819;

VPHR 1125 is the home row of AVP 821;

VPRHC 1127 is the column of the current upper right-hand corner of AVP 821 in APAGE 819;

VPRHR 1129 is the row of the current upper right-hand corner of AVP 821;

PDRC 1131 is the column in APAGE 819 of the current lower right-hand corner of that page;

PDRR 133 is the row in APAGE 819 of the current lower right-hand corner of that page.

Use of these fields will be explained in connection with the modes and Protocols which control pages 801 and VPs 811.

Continuing with the modes and protocols, these are shown in FIGS. 5, 6, and 12. The discussion will begin with the protocols which define pages and viewports and their relationship to each other, will continue with protocols specifying the location of AP 815 and modes governing the relationship between AP 15 and CP 817 and AVP 821, and will conclude with protocols which permit scrolling within a page 801 and copying between pages 801.

Pages are defined by the private define page protocol 1209 (FIG. 12). The protocol's parameters are as follows:

[PN] specifies the page number;

[PR] specifies the number of rows in the page;

[PC] specifies the number of columns in the page.

The private operation specifier is X'23' followed by the ASCII code for lower-case y.

When TERM 103 receives a define page protocol 1209, uP 201 uses the values in the protocol to allocate space for the new page from FS 805 in DISPM 213 and set fields in APT 903 and PDEF 921 of FIG. 9. uP 201 begins by checking APT 903 for an APTE 905 for the page number specified in [PN]. If there is an APTE 905, uP 201 determines whether the redefined page will fit in the space in DISPM 213 previously allocated for the page 801. If it will, uP 201 simply sets PR 925 and PC 927 to the values of the [PR] and [PC] parameters respectively. If the redefined page will not fit, uP 201 sets PS 923 to indicate that space in DISPM 213 for the page is being allocated and attempts to allocate the space required for the number of rows and columns specified in FS 805. If there is sufficient space, the address of the beginning of the new page is placed in PADDR 929 and PS 923 is set to indicate that the page has been allocated. If there is not sufficient space in FS 805, uP 201 rearranges the pages 801 in DISPM 213 so that all of the unused space in DISPM 213 is in FS 805 and again attempts to allocate the new page 801. If there is enough space in FS 805, PADDR 929 and PS 923 are reset as described above; otherwise, PS 923 continues to indicate that the page was not allocated. At the end of the attempt to allocate, NP MEM 825 is updated to point to the new beginning of FS 805.

If there is no APTE 905 for the page 801 defined by the protocol, uP 201 creates an APTE 905 containing the value of the [PN] parameter in the first APTE 905 which contains the value 0. Next, PR 925 and PC 927 are set from [PC] and [PR] and uP 201 attempts to allocate the page 801 as described above. If the allocation is successful, PS 923 indicates that fact and PADDR 929 contains a pointer to the new page; otherwise, PS 923 indicates that the allocation was not successful.

As previously indicated, define page protocol 1213 may define a page with no rows and columns. In that case, if the page is being redefined, PADDR 929 is cleared and PS 923 is set to indicate that no page 801 has been allocated in DISPMEM 213. If the page is being newly defined, no allocation is made in DISPMEM 213 and PS 923 is set to indicate that fact.

Viewports are defined by define viewports protocol 1209. There is a parameter [VP(n)R] for each VP 811 being defined in SCR 807 except the first. The first parameter corresponds to the second VP 811, the second to the third, and so forth. Each parameter sPecifies the VPR 809 in SCR 807 at which the corresponding VP 811 begins. Each parameter value must be larger than the preceding parameter value. If no parameters are given, the first viewport occupies all of SCR 807.

When uP 201 responds to define viewports protocol 1209, it first rebuilds all of the VPDEFs 907 and then rebuilds RT1 1003. The first stage in the rebuilding of VPDEFs 907 is clearing the fields in the entries. VPDEF 907 for the first VP 811 is then created by setting VPN 909 to 1, computing the number of VRNs 913 in the VP 811 from the parameters, setting VRN 913 to that number, and setting BKR 911 to the number of VPRs 809, since VP 811 is not yet assigned to a page and therefore contains only blank rows. uP 201 then proceeds to create the VPDEFs 907 for the other VPs 811 by setting VPN 909 to the viewport number, VRN 913 to the number of VPRs 809 specified in the parameter for the viewport, and BKR 911 to indicate that number of blank rows.

Reconstruction of RT1 1003 is carried out by building a new row table in RT2 1015 as required for the newly-defined VPs 811 and then copying the finished new row table into RT1 1003. The new row table contains a VPRE 1009 corresponding to each of the newly-defined VPs 811. Since BKR 911 in each of the VPs 811 indicates that all VPRs 809 are blank rows, uP 201 simply fills each VPRE 1009 with a NRPTR 1011 pointing to NPAGE 1013. Once VPs 811 have been defined, the private assign page to vie TM port protocol 1211 assigns a VP 811 to a page 801. The protocol consists of CSI, the parameters, and the private operation specifier X'23' followed by the ASCII code for lower-case "z". The parameters in the protocol are the following:

[PN]: the number of the page 801 to which the VP 811 is being assigned;
[VPN]: the number of the VP 811 being assigned;
[PSR]: the "home row" of VP 811 in page 801;
[PSC]: the "home column" of VP 811 in page 801.

The parameters thus determine which page the VP 811 is assigned to and the "home position" of the VP 811 in page 801.

uP 201 carries out assignment of a VP 811 to a page 801 in response to protocol 1211 by setting fields in VPDEF 907 and resetting the RTEs 0114 in the VPRE 1009 for the VP 811 in RT1 1003 so that the MRs 803 displayed in VP 811 appear on SCR 807. In VPDEF 907 for the VP 811 being assigned, APN 915 is set from the [VPN] parameter and VHR 917 and VHC 919 from the [PSR] and [PSC] parameters. Next, uP 201 compares the number of MRs 803 following the VP 811's home position with the number of VPRs 809 in the VP 811, specified in VRN 913. If the number of VPRs 809 is greater, BKR 911 is set to indicate the difference. If the page specified in [VPN] does not exist or if [PSR] and [PSC] specify positions which do not exist in the specified page 801, BKR 911 is set to indicate all of the VPRs 809 in the VP 811. In modifying the VPRE 1009, uP 201 begins at the bottom of the VPRE 1009 and fills as many RTEs 1004 as there are rows specified in BKR 911 with NRPTR 1011. It fills the remaining RTEs 1004 with RPTRs 1005 to the MRs 803 which will appear in VP 811 as defined by VHR 917 and VHC 919.

Once pages 801 have been defined, the standard ANSI next page and previous page protocols and the private set active position protocol 1207 may be used to move AP 815 in DISPM 213 between pages 801, while the standard ANSI cursor protocols may be used to move AP 815 on a page 801. DePending on how the bits in mode flags 505 for the cursor attach mode, the auto map mode, and the auto alignment mode are set, movement of AP 815 may result in movement of CP 817 and the active viewport (AVP) 821. The protocols are first described on the presumption that none of the above modes are in effect.

The ANSI next page protocol permits HC 101 to specify that AP 815 be moved forward one or more pages, and the ANSI previous page protocol permits HC 101 to specify that AP 815 be moved back one or more pages. The page 801 to which AP 815 may be moved may be a page 801 with no display positions. In that case, the only operations involving AP 815 which may be performed are moving AP 815 into and out of the page 801. When a page 801 has display Positions, AP 815 is set at the first column in the first MR 803 in the selected page 801. The selected page becomes APAGE 819 and uP 201 sets fields in APD 1101 to specify the new APAGE 819 and, if the new APAGE 819 has display positions, the new AP 815. The fields are the following: APN 1103, ACN 1107, ARN 1109, ARS 1111, ARE 1113, APA 1115, PTP 1119, PBP 1121, PDRC 1131, and PDRR 1133. If there is a VP 811 defined for the new APAGE 819 and AP 815 is in the VP 811, that VP 811 becomes AVP 821 and AVPN 1105, VPHC 1123, VPHR 1125, VPRHC 1127, and VPRHR 1129 are set as required for the new AVP 821.

The private set active position protocol 1207 permits AP 815 to be moved to any of the Pages 801 in DISPM 213. Again, AP 815 may be moved to a page 801 with no display positions. The protocol consists of the CSI code. the > private protocol indicator, the parameters [PR], [PC], and [PN], and the command code uppercase H. [PN] specifies the page 801 and [PR] and [PC] specify the row and column in the page respectively. The page 801 specified by [PN] becomes APAGE 819 and the row specified by [PR] and the column specified by [PC] become the new AP 815 and APD 1101 is updated accordingly. If the new AP 815 is within VP 811 assigned to APAGE 819, that VP 811 becomes the new AVP 821 and the fields of APD 1101 are updated accordingly. Within APAGE 819, AP 815 is moved by means of the standard ANSI cursor controls. With each move, APD 1101 is updated. If AP 815 moves into VP 811 assigned to APAGE 819, that VP 811 becomes the new AVP 821 and that fact is reflected in the update of APD 1101.

Continuing with the modes, when the cursor attach mode is set, CP 817 changes whenever AP 815 does; when the mode is reset, changes in AP 815 do not affect CP 817. The mode is set and reset by means of protocols 601 and 603, and the parameter value for the mode is 8. The bit which is set and reset by the parameter 8 is CA bit 518 in MF3 516 of mode flags 505. When CA bit 518 is set, uP 201 responds to Protocols which change AP 815 by updating CPA 1117 of APD 1101 whenever APA 1115 changes.

When the auto map mode is set and AP 815 is moved to a different page, the current AVP 821 is automatically assigned to the new APAGE 819 and located at the upper left-hand corner of APAGE 819. If the new APAGE 819 had a VP 111 assigned to it, that VP 811 is deassigned. When the auto map mode is reset, movements of AP 815 do not alter the assignment of VPs 811 to pages. The mode is set and reset by protocols 601 and 603, using 29 as the parameter value. The flag for the mode is AM flag 535 in MF2 512. When MF2 512 is set and AP 815 moves to a different page, uP 201 updates the relevant fields of APD 1101 and updates the affected VPDEFs 907 as follows: it updates VPDEF 907 for any VP 811 previously assigned to the new APAGE 819, sets APN 909 to 0 and BKR 911 to indicate all blank lines, and clears VHR 917 and VHC 919. uP 201 further updates the VPDEF 907 for AVP 821 to reflect the new assignment, and updates the VPREs 1009 for the two VPs 811 as previously described to reflect the fact that the one VP 811 is no longer assigned and the other has a new location.

When the auto alignment mode is set, there is a VP 811 assigned to APAGE 819, and AP 815 is moved so that it is no longer within AVP 821, but remains in APAGE 819, AVP 821 automatically changes its location on APAGE 819 so that AP 815 remains in AVP 821. When the mode is reset, movements of AP 815 within APAGE 819 have no effect on AVP 821. When both auto alignment and auto map are set and AP 815 is moved to a new APAGE 819, AVP 821 is moved to a position in the new APAGE 819 such that AP 815 is in AVP 821. The auto alignment mode is set and reset by means of the parameter 36 in protocols 601 and 603. The bit for the mode is AA flag 538 in MF1 506. When auto alignment is set and AP 815 moves out of the portion of APAGE 819 currently displayed in AVP 821, uP 201 updates VPRHC 1127 and VPRHR 1129 to give AVP 821 a position which includes AP 815 and RTEs 1004 in VPRE 1009 for the AVP 821 are set so that they point to the MRs 803 currently in AVP 821.

11. The Scroll Region and Copy Region Protocols: FIG. 12

Two novel protocols used to manipulate regions of pages 801 in TERM 103 are scroll region and copy region, shown in FIG. 12. Each of these protocols affects only DISPM 213 and has no effect on AP 815 or on the position of any VP 811 assigned to the page. Scroll region protocol 1201 permits the MRs 803 in a region of APAGE 819 to be scrolled up or down. The private protocol has the following parameters:

[SR]: Number of the first row in the region to be scrolled;
[ER]: Number of the last row in the region to be scrolled;
[SN]: Number of rows the region is to be scrolled up or down;
[SD]: Direction in which the region is to be scrolled. 1=up, 0=down.

Using APD 1101 to determine APAGE 819 and the parameters and the fields of PDEF 921 for the active page to locate the region specified by the protocol in DISPM 213, uP 201 proceeds as follows when the direction of scrolling is down: the number of rows specified by [SN] are deleted at the bottom of the region, the remaining rows in the region are moved down the number of rows specified by [SN] and the uppermost [SN] rows in the region are filled with blank rows. When scrolling is up, the reverse occurs.

Copy region protocol 1215 is used to copy a region from one page 801 to a region of another page 801. Source and destination pages 801 may be the same or different. Two modes are possible: in copy mode, the region simply replaces a region of the destination page; in scroll mode, a region of the destination page is scrolled down to permit insertion of the copied region. The parameters are the following:

[PD]: the number of the destination page 801;
[PDR]: the row in the destination page 801 which is at the beginning of the region to which the data is to be copied;
[PS]: the number of the source page;
[PSR]: the row in the source page which is at the beginning of the region from which the data is to be copied;
[NR]: the number of rows in the region to be copied; and
[CM]: the mode of the operation; 0 is replace, 1 is insert.

If the rows of the destination region have a different length than those of the source region, the rows are padded or truncated on the right as necessary when the operation is performed. uP 201 uses PDEF 921 and the parameters for the protocol to locate the regions in the specified pages 801; uP 201 then performs the copy as follows: If insert mode is specified, the part of the destination page 801 beginning at [PDR] is scrolled down; a number of rows equal to [NR] are lost from the bottom of the destination page 801. Then the starting positions in the source and destination regions are determined and characters and attributes are copied from source to destination one at a time, proceeding from left to right and top to bottom.

Figure 14:
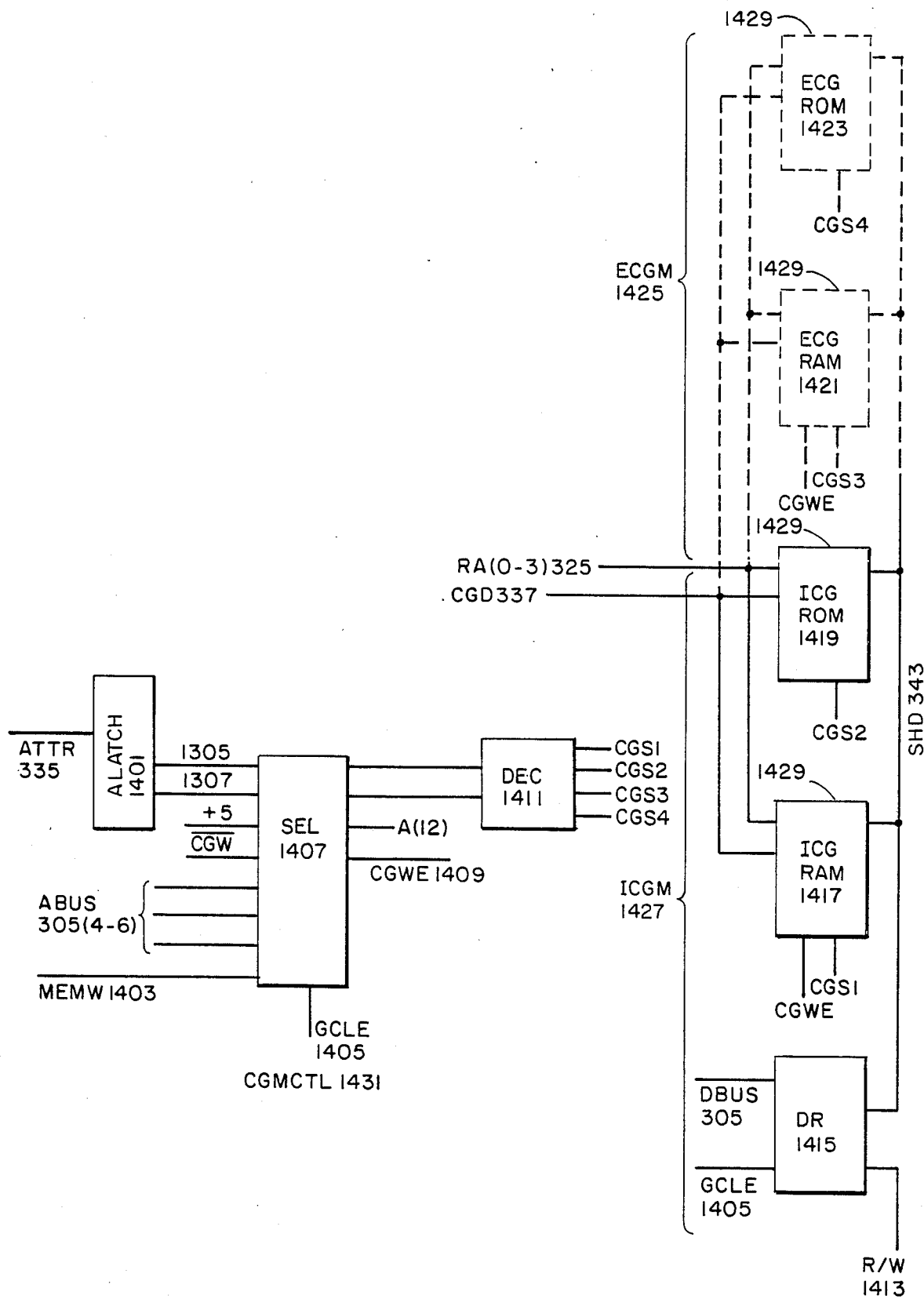
FIG. 14, titled "Implementation of CGM 324", is a schematic of an implementation of the character generator memory in a preferred embodiment of the improved terminal.

12. CGM 329 in a Preferred Embodiment: FIGS. 13–15

Characters displayed by TERM 103 may belong to any one of up to 12 character sets. Visual representations for all of the character sets presently available to TERM 103 are stored in CGM 329. Which character set a given character belongs to is determined by the code and attribute bytes representing the character in DISPM 213. Together, the code byte and two bits of the attribute byte form an address specifying the location in CGM 329 of the visual representation corresponding to the code in the code byte.

The code byte and attribute byte for a given ASCII character in DISPM 213 are set when the ASCII character is received from HC 101 and written into DISPM 213. The values to which the code and attribute bytes are set are determined by variables in CTLD 239. These variables are in turn set by protocols. Protocols of interest in the present context are a designate character set protocol and activate character set protocols. The designate character set protocol selects one of the 12 character sets as one of four designated character sets which may be presently activated; 9 activate character set protocols then select one of the four designated character sets as one of two active character sets, GL and GR. All received character codes with a code value of X'21' through X'7E' are treated as belonging to GL, and all received character codes with a code value of X'A1' through X'FE' are treated as belonging to GR. When the character code is received, the code byte and attribute byte which represent the character code in DISPM 213 are set to address the visual representation for the code in the character set in CGM 329 specified by the last received activate character protocol for the range of values to which the received character code belongs.

As previously explained in overview, CGM 329 in a preferred embodiment may have up to four elements. Two of those elements are RAM and ROM which are internal to TERM 103; the other two elements are RAM and/or ROM cartridges which may be inserted in TERM 103. Each of the elements may contain three character sets. In the preferred embodiment, two bits in the attribute byte in DISPM 213 associated with a character code specify which of the four elements is selected and the 8 bits in the character code specify which character set and character in the selected element. In the following, the implementation of GCM 329 and a protocol by means of which visual representations may be copied from one element of CGM 329 to another will be discussed in detail.

Beginning with FIG. 15, that figure shows the attribute byte in a preferred embodiment. Attribute byte (AB) 1301 contains 6 1-bit fields and a two-bit field. The six one-bit fields determine the manner in which the character specified by the character code associated with the attribute byte is displayed. When BLA is set, a blank is displayed instead of the character specified by the code; when SU is set, the character has a single underline; when SR is set, the character is displayed in reverse video mode; when BLI is set, the character blinks; when DU is set, the character is displayed with a double underscore; when HI is set, the character is displayed with high intensity. The two-bit field, character set selection (CSS) field 1303, specifies one of the four elements in CGM 329. The bits in that field are labelled CS1 1305 and CS2 1307 respectively. Continuing with FIG. 14, that figure shows the implementation of CGM 329 in a preferred embodiment. CGM 329 has three main components: external CGM (ECGM) 1425, that portion of CGM 329 which is user-installable in sockets in TERM 103, internal CGM (ICGM) 1427, that portion of CGM 329 which is a permanent part of CGM 329, and CGMCTL 1431, the logic which controls operation of CGM 329. ICGM 1427 in a Preferred embodiment consists of two CGM elements 1429: ICGROM 1419, a read-only memory, and ICGRAM 1417, a read/write memory. ICGROM 1419 and ICGRAM 1417 are addressed by RA(0–3) 325 and CGD 337, as explained in the discussion of FIG. 3. Data output from ICGROM 1419 and ICGRAM 1417 and data input to ICGRAM 1417 are via SHD bus 343. Additionally, ICGM 1427 includes driver (DR) 1415, a bi-directional driver which connects DBUS 305 to SHD bus 343 and consequently permits data to be written to the writable portions of CGM 329 by uP 301 or read from CGM 329 by uP 301. DR 1415 is enabled by a signal on GCLE 1405, which is in turn decoded from bits on ABUS 303. Direction of transfer through DR 1415 is controlled by R/W line 1413, whose value is set by uP 301. Components of ECGM 1425 also receive addresses from RA(0–3) 325 and CGD 337 and output and receive data on SHD 343. Each of the two elements 1429 in ECGM 1425 may be either a ROM (ECGROM 1423) or a RAM (ECGRAM 1421).

Each element 1429 in CGM 329 has an output enable line, indicated by CGS1 through CGS4 in FIG. 14, and writable elements have a write enable line, indicated by CGWE. Control of reading and writing via those lines is by means of CGMCTL 1431. Whenever an attribute byte (AB 1301) is output from RRAM 323 onto ATTR bus 335, it is latched into ALATCH 1401. Signals controlled by bits 1305 and 1307 of AB 1301 go to SEL 1407, a quadruple 2 line to 1 line selector. SEL 1407 receives two sets of input signals. One includes bits 1305 and 1307, a +5 V input and a signal NOT CGW which indicates that CGM 329 is not to be written to. The other includes bits 4–6 of ABUS 305 and a memory write signal (MEMW) 1403, indicating that CGM 329 is to be written to. SEL 1407 selects one set of its inputs as outputs in response to GCLE 1405, which, as previously indicated, is decoded from ABUS 303. When uP 301 is not reading or writing GCM 329, GCLE 1405 selects the inputs from the first set, and when uP 301 is reading or writing GCM 329, GCLE 1405 selects the inputs from the second set. Two bits of the selected inputs, derived from bits 1305 and 1307 or ABUS 305 (5 and 6) go to DEC 1411, where one of CGS1 through CGS4 is activated, depending on the element 1429 specified either by bits 1305 and 1307 or ABUS 305 bits 5 and 6. A third bit is employed as the thirteenth address bit in each of elements 1429. The fourth bit, CGWE 1409, enables writing in writable elements 1429.

As may be seen by the foregoing discussion, when DC 315 causes RRAM 323 to output a character code and its associated attribute byte to CGM 329 for display, the value of CSS 1303 in the attribute byte selects element 1429 in CGM 329, while the character code together with RA (0–3) 325 provided by DC 315 specify an address in the selected element. When uP 301 reads or writes CGM 329, the value of ABUS 305 bits 5 and 6 selects element 1429, while the address in the selected element 1429 is made up of RA (0–3) provided by uP 301 and 8 bits on DBUS 305 provided by uP 301. Depending on the value of R/W 1413, uP 301 can read from any element 1429 and write to writable elements 1429.

A preferred embodiment of TERM 103 takes advantage of uP 301's ability to read and write elements 1429 by means of a protocol, shown in FIG. 15, which permits HC 101 to specify that a portion of the contents of a source element 1429 be copied to a destination element 1429. As previously mentioned, another protocol permits part or all of a writable element 1429 to be loaded from HC 101. Thus, the character set of a writable element 1429 may be made up of visual representations received from HC 101, of visual representations received from another element 1429, or of a combination of both.

The private Copy CGM protocol 1501 begins with the CSI code; its parameters are the following:

[SE] is the element 1429 which is the source of the visual representations;

[DE] is the element 1429 which is the destination thereof;

[SS] is the starting location in SE;

[DS] is the starting location in DE;

[NC] is the number of visual representations to be copied.

The command specifier is X'23' followed by the ASCII code for lower-case v. [SE] may have the value 0. In that case, the protocol erases the number of visual representations in [DE] specified by [NC], beginning at the location specified by [DS].

As may be seen from the discussion of FIG. 14, uP 301 responds to the protocol by beginning at [SS] in the element 1429 specified in [SE] and copying each visual representation first from that element 1429 to a register in uP 301 and then from that register to the proper

13. Conclusion

The foregoing Description of a Preferred Embodiment hasve disclosed the best mode presently known to the inventors of implementing the improved terminal of the present invention. The improvements described herein have included highly flexible display memory-page mapping, independently definable pages and viewports, viewports which automatically follow the active position, and protocols permitting a region of a page to be scrolled or copied to a region on any page.

Other improvements include improved control of transfer of data between a digital computer and the terminal and an auxiliary device connected to the terminal and a transparency mode which automatically translates 8-bit protocols into ANSI equivalent prefix+code sequences. Finally, the terminal includes improved apparatus for accessing the character generator memory and executes a protocol by means of which a portion of the contents of character generator memory may be copied from one element to another thereof.

While the embodiment described herein is the best presently known to the inventors, the inventions may be implemented in other embodiments. Consequently, the disclosed embodiments are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. In a video display system including a display controller responsive to row pointers specifying rows of display memory,
    viewport display defining means for defining how a given number of rows of display memory are to be displayed in a viewport having a number of display rows which is greater than the given number of rows of display memory, the viewport display defining means comprising:
    a null row of display memory which always contain codes indicating no display;
    a table of row pointers corresponding to the viewport, the table having as many row pointers as there are display rows in the viewport and the row pointers including a row pointer to each of the rows in the given number of rows of display memory and a row pointer to the null row for each of the display rows which is not being used to display row of display memory; and
    means for providing the row pointers in the table to the display controller,
    whereby the display controller correctly displays a viewpoint in which there is a greater number of display rows than there are display memory rows being displayed.

2. In display apparatus connected to a host processor and to an auxiliary device,
    data transfer means for transferring data alternatively between the host processor and the display apparatus and between the host processor and the auxiliary device, the data transfer means comprising:
    first transfer means for transferring data from either the display apparatus or the auxiliary device to the host;
    second transfer means for transferring data from the host to either the display apparatus or the auxiliary device; and
    settable data transfer control means for controlling the first transfer means and the second transfer means independently of each other, the settable data transfer control means being settable to cause the first transfer means to transfer data received from either the display apparatus or the auxiliary device and to cause the second transfer means to provide data to either the display apparatus or the auxiliary device.

3. The data transfer means set forth in claim 2 and wherein:
    the display apparatus receives protocols from the host processor;
    the protocols include transfer control protocols for specifying whether the first transfer means receives the data from the display apparatus or the auxiliary device and whether the second transfer means provides the data to the display apparatus or the auxiliary device; and
    the data transfer control means responds to a received one of the transfer control protocols by setting itself to cause the first transfer means to receive the data from the display apparatus or the auxiliary device or the second transfer means to provide the data to the display apparatus or the auxiliary device as specified by the received transfer control protocol.

4. In display apparatus having both a display memory divisible into display positions and an output device for outputting a display divisable into display lines,
    means for defining the display comprising:
    means for defining a page, the page including a specified set of the display positions;
    means for defining a viewport on the output device, the viewport including a specified set of the display lines;
    correspondence establishing means for establishing a correspondence between a member of the set of display positions and a member of the set of display lines; and
    means for outputting on each display line the contents of any corresponding display positions and when the correspondence establishing means has established no correspondence between any member of the set of display positions and a given member of the set of display lines, outputting certain display data on the given display line,
    whereby no correspondence is required between a set of display positions and a member of the set of display lines, permitting the page and the viewport to be defined independently of each other.

5. The display defining means set forth in claim 4 and wherein:
    the specified set of the display positions may be the null set.

6. The display defining means set forth in claim 4 and wherein:
    the certain display data is a blank character with default attributes.

7. The display defining means set forth in claim 4 and wherein:
    the display apparatus is connected to a computer system and responds to members of a set of protocols received therefrom;

the means for defining a page responds to a define page control of the protocols which specifies the set of display positions; and the means for defining a viewport responds to a define viewport protocol which specifies the set of display lines.

8. The display defining means set forth in claim 7 and wherein:

the means for defining a page defines a plurality of pages and defines a given one of the pages in response to the define page protocol;

the means for defining a viewport defines a plurality of viewports and defines a given one of the viewports in response to the define viewport protocol; and the means for establishing a correspondence establishes a correspondence between the set of display positions belonging to a given one of the pages and the set of display lines belonging to a given one of the viewports.

9. The display defining means set forth in claim 8 and wherein:

the means for establishing a correspondence establishes the correspondence in response to an assign page to viewport protocol specifying the given one of the pages and the given one of the viewports.

10. The display defining means set forth in claim 9 and wherein:

the assign page to viewport protocol further specifies the correspondence between the set of display positions belonging to the given one of the pages and the set of display lines belonging to the given one of the viewports and the means for establishing a correspondence further establishes the correspondence in response thereto.

11. The display defining means set forth in claim 10 and wherein:

the display defining means further includes active position specification means for specifying a certain display position as an active position, the page to which the certain display position belongs as an active page, and any viewport which is assigned to the active page and for which the correspondence establishing means has established a correspondence between the active position and the viewport's set of display lines as an active viewport; and the means for establishing a correspondence responds to a specification of the active position by the active position specification means at a display position in the active page for which no correspondence with the viewport's set of display lines has been established by establishing a new correspondence between display positions and display lines in the active viewport such that the display data at the active position is output to a display line in the active viewport.

12. In display apparatus having a display memory divisible into at least one set of display positions and an output device for outputting a display divisible into at least one viewport and means for establishing a correspondence between a given set of display positions and a given viewport such that the given viewport displays at least a portion of the given set of display positions, means for defining the display comprising:

specification means for specifying an active display position in the display positions and an active viewport displaying a first portion of the set of display positions to which the active viewport corresponds, the first portion including the active display position and in the means for establishing a correspondence, auto alignment means for responding to the specification means by establishing a new correspondence between the active viewport and a second portion of the corresponding set of display positions including the active position when the specification means specifies that the active display position is no longer in the first portion.

13. The display defining means set forth in claim 12 and wherein:

the display apparatus has an auto alignment mode specifier for controlling the auto alignment means; and the auto alignment means responds when the specification means specifies that the active display position is no longer in the first portion of the set of display positions only when the auto alignment mode specifier so specifies.

14. The display defining means set forth in claim 13 and wherein:

the display apparatus is connected to a computer system and receives members of a set of protocols therefrom;

the set of protocols includes an auto alignment mode protocol which specifies the setting of the auto alignment mode specifies; and the display apparatus responds to the auto alignment mode protocol by setting the auto alignment mode specifies as specified in the auto alignment mode protocol.

15. In display apparatus having a display memory divisible into display positions, each display position belonging to one page of a plurality of pages in the display memory, and an output device for outputting a display divisible into at least one viewport of a plurality of viewports, the viewport being assignable to one of the pages and displaying a set of display positions on the page to which the viewport is assigned, and means for establishing a correspondence between a given viewport and a given page to which the given viewport is assigned and between the given viewport and a given set of display positions on the given page such that the given viewport displays at least a portion of the given set of display positions, means for defining the display comprising:

specification means for specifying an active display position in the display positions and an active viewport of the viewports; and in the means for establishing correspondence, auto mapping means for responding to the specification means when the specification means specifies that the active display position is presently in another page by assigning the active viewport to the other page.

16. The display defining means set forth in claim 15 and wherein:

the auto mapping means further deassigns any viewport assigned to the other page before assigning the active viewport to the other page.

17. The display defining means set forth in claim 16 and wherein:

the display apparatus is connected to a computer system and receives members of a set of protocols therefrom;

the set of protocols includes an auto mapping mode protocol which specifies the setting of the auto mapping mode specifier; and the display apparatus responds to the auto mapping mode protocol by setting the auto mapping mode specifier as specified in the auto mapping mode protocol.

18. The display defining means set forth in claim 15 and wherein:

the display apparatus has an auto mapping mode specifier for controlling the auto mapping means; and the auto mapping means responds when the specification means specifies that the active display position is presently in another page only when the auto mapping mode specifier so specifies.

19. The display defining means set forth in claim 15 and wherein:

the auto mapping means establishes a correspondence between a first set of display positions and the active viewport such that the active viewport displays at least a portion of the first set of display positions and the means for establishing a correspondence further includes auto alignment means for responding to the specification means by establishing a new such correspondence between the active viewport and a second set of display positions including the active display position which belongs to the same page when the specification means specifies that the active display position is no longer in the first set of display positions.

20. In display apparatus controllable by protocols, having a display memory divided into display positions, and having means for defining rows and pages in the display memory such that each display position belongs to a row and a page, means for copying a first set of the display positions into a second set of the display positions comprising:

a copy region protocol which specifies the first set of display positions by specifying a first page, a starting row, and a number of rows on the first page and specifies the second set of display positions by specifying a second page and a starting row on the second page and means in the display apparatus responsive to the copy region protocol for copying the contents of the first set of display positions into the second set of display positions.

21. The copying means set forth in claim 20 and wherein:

the copy region protocol further specifies an insertion mode; and the means responsive to the copy protocol detects whether the copy region protocol specifies the insertion mode, and when the copy region protocol so specifies, the means responsive to the copy region protocol moves the contents of all rows from the starting row to the end of the second page a number of rows down the second page which is the same as the number of rows specified in the copy region protocol before copying the contents of the specified rows from the first page to the second page.

22. In display apparatus which is responsive to protocols and which includes display output means and character generation means including writable character generation memory means containing visual representation data from which the display output means generates a visual representation of a character, means for copying visual representation data from a first portion of the character generation memory means to a second portion thereof comprising:

a copy character generation memory protocol specifying the location of the first portion and of the second portion; and means responsive to the copy character generation memory protocol for copying the visual representation data contained in the first portion into the second portion.

23. The means for copying visual representation data set forth in claim 22 and wherein:

the copy character generation means protocol may specify a null portion as the first portion; and the means responsive to the copy character generation memory protocol responds to a copy character generation memory protocol which has a null portion as the first portion by erasing the second portion.

24. The means for copying visual representation data set forth in claim 22 and wherein:

the writable character generation memory means is divided into a plurality of elements;

the visual representation data in each element is divided into a number of items; and the copy character generation memory protocol specifies the element containing the first portion and an item in the first portion, the element containing the second portion and an item in the second portion, and a number of items to be copied.

25. In display apparatus which is connected to a host processor and to an auxiliary device, responds to destination protocols from the host processor specifying either the display apparatus or the auxiliary device as a destination for data from the host processor, and provides at least a termination protocol requesting termination of transmission to the host processor, a method performed by the display apparatus to ensure that the display apparatus can respond to one of the destination protocols comprising the steps of:

monitoring a receiving buffer for receiving protocols from the host processor to determine whether the buffer can accomodate the destination protocol;

sending the termination protocol to the host processor while the buffer can still accomodate the destination protocol;

continuing to receive protocols in the receiving buffer; and continuing to process the protocols in the receiving buffer, whereby the display apparatus is always able to receive and process a destination protocol sent by the host processor in response to the termination protocol.

26. The method set forth in of claim 25 and wherein:

the receiving buffer includes a host receiving buffer for receiving the data from the host processor and an auxiliary device transmitting buffer for receiving the data from the host receiving buffer and providing the data to the auxiliary device when the auxiliary device is the destination and the step of sending the transmission termination request protocol is performed when the step of monitoring the receiving buffer determines that a first minimum amount of space remains in the host receiving buffer or a second minimum amount of space remains in the auxiliary buffer transmitting buffer.

27. In display apparatus which is connected to a host processor and to at least one other data source and which provides data from itself and the other data source to the host processor,
a method performed by the display apparatus for ensuring that the host processor is provided data from all of the sources including the display apparatus comprising the steps of:
providing a next tag identifying a next source of data to the processor;
providing data from the next source to the processor for a limited period; and
repeating the above steps so that each of the sources is a next source.

28. In display apparatus which is connected to a host processor and to another data source and provides protocols from itself or from the other data source to the host processor,
a method performed by the display apparatus for informing the host processor that the source not currently providing data has data comprising:
determining that the source not currently providing data has data to provide; and
inserting a message waiting protocol among the protocols currently being provided to the host processor.

29. In display apparatus which is asynchronously connected to a host processor, which provides protocols to the host processor, and which responds to protocols received from the host processor by placing the received protocols in a receive buffer and interpreting the received protocols after they have been placed in the receive buffer,
a method of guaranteeing that the display apparatus will respond to the host processor comprising the steps of:
sending a reset protocol from the host processor to the display apparatus;
responding in the display apparatus to the reset protocol by not placing the reset protocol in the receive buffer and immediately performing steps including clearing the receive buffer;
cancelling processing of any protocol which the display apparatus is interpreting at the time the display apparatus receives the reset protocol; and
enabling the receive buffer to again receive protocols.

30. The method set forth in claim 29 and wherein:
the rest protocol is an ANSI (American National Standards Institute) X3.64 INT protocol.

31. In display apparatus connected to a host computer and to an auxiliary device and wherein the display apparatus provides 8-bit ANSI (American National Standards Institute) protocols to the auxiliary device and receives 8-bit ANSI protocols therefrom but the host computer produces and responds to other protocols for control of the auxiliary device which are not 8-bit ANSI protocols,
a method performed by the display apparatus for operating transparently when the host computer employs the other protocols to control the auxiliary device comprising the steps of:
while the display apparatus is receiving the other protocols from the host computer for transfer to the auxiliary device, converting the other protocols into the equivalent ANSI 8-bit protocols and providing the equivalent ANSI 8-bit protocols to the auxiliary device; and
while the device apparatus is receiving ANSI 8-bit protocols from the auxiliary device for transfer to the host computer, converting the ANSI 8-bit protocols into the equivalent other protocols and providing the equivalent other protocols to the host processor.

32. The method set forth in claim 31 and wherein:
the other protocols are either ANSI 7-bit protocols or non-ANSI 8-bit protocols;
the conversion of ANSI 7-bit protocols into the equivalent ANSI 8-bit protocols is made by converting two ANSI 7-bit prefixes and an ANSI 7-bit code into the equivalent ANSI 8-bit protocol and the conversion into the equivalent other protocol is made by converting the ANSI 8-bit protocol into the equivalent two 7-bit ANSI prefixes and ANSI 7-bit code; and
the conversion of non-ANSI 8-bit protocols into the equivalent ANSI 8-bit protocols is made by converting the non-ANSI 8-bit protocol into an ANSI 8-bit prefix and ANSI 8-bit code.

33. The method set forth in claim 36 and wherein:
the display apparatus has a first mode of operation wherein the display apparatus transfers protocols unchanged between the host processor and the auxiliary device and a second mode of operation wherein the method of claim 36 is performed upon protocols transferred between the host processor and the auxiliary device and
the performance of the steps of the method of claim 36 is preceded by a step wherein the display apparatus receives a protocol from the host processor which specifies the second mode of operation and responds thereto by enabling the second mode of operation.

* * * * *

UNITED STATES PATENT AND TRADEMARK OFFICE
CERTIFICATE OF CORRECTION

PATENT NO. : 4,954,966

DATED : Sept. 4, 1990

INVENTOR(S) : Robert C. Mooney

It is certified that error appears in the above-identified patent and that said Letters Patent is hereby corrected as shown below:

ON TITLE PAGE Item [54]

In the title: Please replace "FLAN" with --FLOW--
Column 3, Line 3: Please insert --of-- after Implementation
Column 7, Line 18: Please begin a new paragraph after 213
Column 31, Line 2: Please replace "control" with --protocol--
Column 32, Line 20: Please replace "specifies" with --specifier--
Column 32, Line 29: Please replace "specifies" with --specifier--
Column 32, Line 32, replace "specifies" with --specifier--

Signed and Sealed this

Seventeenth Day of December, 1991

Attest:

HARRY F. MANBECK, JR.

Attesting Officer

Commissioner of Patents and Trademarks